US011421886B2

(12) United States Patent
Endo et al.

(10) Patent No.: US 11,421,886 B2
(45) Date of Patent: Aug. 23, 2022

(54) FUEL FLOW RATE SETTING METHOD, DEVICE FOR IMPLEMENTING SAID METHOD, AND GAS TURBINE PLANT PROVIDED WITH SAID DEVICE

(71) Applicant: Mitsubishi Hitachi Power Systems, Ltd., Kanagawa (JP)

(72) Inventors: Yoji Endo, Yokohama (JP); Hisashi Nakahara, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 567 days.

(21) Appl. No.: 15/737,909

(22) PCT Filed: Jul. 7, 2016

(86) PCT No.: PCT/JP2016/070119
§ 371 (c)(1),
(2) Date: Dec. 19, 2017

(87) PCT Pub. No.: WO2017/022397
PCT Pub. Date: Feb. 9, 2017

(65) Prior Publication Data
US 2018/0299131 A1 Oct. 18, 2018

(30) Foreign Application Priority Data

Jul. 31, 2015 (JP) .............................. JP2015-152152

(51) Int. Cl.
F23R 3/34 (2006.01)
F02C 7/228 (2006.01)
(Continued)

(52) U.S. Cl.
CPC .............. *F23R 3/343* (2013.01); *F02C 7/228* (2013.01); *F02C 9/28* (2013.01); *F23R 3/32* (2013.01); *F23R 3/346* (2013.01); *F23R 3/36* (2013.01)

(58) Field of Classification Search
CPC .... F02C 9/20; F02C 9/26; F02C 9/263; F02C 9/28; F02C 9/34; F02C 9/50; F02C 9/54;
(Continued)

(56) References Cited

U.S. PATENT DOCUMENTS

2004/0060301 A1 4/2004 Chen et al.
2006/0101814 A1 5/2006 Saitoh et al.
(Continued)

FOREIGN PATENT DOCUMENTS

JP 6-10711 1/1994
JP 2006-29162 2/2006
(Continued)

OTHER PUBLICATIONS

International Search Report dated Oct. 4, 2016 in International (PCT) Application No. PCT/JP2016/070119.
(Continued)

*Primary Examiner* — Arun Goyal
*Assistant Examiner* — William L Breazeal
(74) *Attorney, Agent, or Firm* — Wenderoth, Lind & Ponack, L.L.P.

(57) ABSTRACT

A gas turbine fuel flow rate setting device includes a flow rate ratio computing unit and a flow rate computing unit. The flow rate ratio computing unit is configured to accept a parameter having a correlation with a gas turbine output, and use a predetermined flow rate ratio relationship between the parameter and a fuel flow rate ratio between a plurality of premixing nozzle groups to determine a fuel flow rate ratio corresponding to the parameter which has been accepted.

(Continued)

The flow rate computing unit is configured to use the fuel flow rate ratio determined by the flow rate ratio computing unit to determine a flow rate of a fuel to be supplied to each of the plurality of premixing nozzle groups.

19 Claims, 14 Drawing Sheets

(51) Int. Cl.
  *F02C 9/28* (2006.01)
  *F23R 3/36* (2006.01)
  *F23R 3/32* (2006.01)
(58) Field of Classification Search
  CPC .. F02C 9/56; F23R 3/286; F23R 3/346; F23R 2900/00013; F05D 2260/96; F05D 2260/964; F05D 2270/14
  See application file for complete search history.

(56) References Cited

U.S. PATENT DOCUMENTS

| | | | | |
|---|---|---|---|---|
| 2007/0079593 | A1* | 4/2007 | Fujii | F02C 9/28 60/39.27 |
| 2009/0229238 | A1* | 9/2009 | Zhang | F23N 5/16 60/39.24 |
| 2011/0016873 | A1* | 1/2011 | Nakamura | F02C 9/34 60/772 |
| 2011/0056180 | A1 | 3/2011 | Nomura et al. | |
| 2013/0014514 | A1 | 1/2013 | Romig et al. | |
| 2013/0139511 | A1* | 6/2013 | Sometani | F23R 3/54 60/722 |
| 2013/0213052 | A1* | 8/2013 | Brickwood | F23N 5/242 60/776 |
| 2015/0354467 | A1 | 12/2015 | Kishi et al. | |
| 2016/0326967 | A1* | 11/2016 | Yamamoto | F02C 9/28 |

FOREIGN PATENT DOCUMENTS

| | | |
|---|---|---|
| JP | 2006-145073 | 6/2006 |
| JP | 2007-77867 | 3/2007 |
| JP | 2010-84703 | 4/2010 |
| JP | 2010-127242 | 6/2010 |
| JP | 2012-149543 | 8/2012 |
| JP | 2013-96303 | 5/2013 |
| WO | 2014/129458 | 8/2014 |

OTHER PUBLICATIONS

Written Opinion of the International Searching Authority dated Oct. 4, 2016 in International (PCT) Application No. PCT/JP2016/070119, with English translation.

* cited by examiner

FUEL FLOW RATE SETTING METHOD, DEVICE FOR IMPLEMENTING SAID METHOD, AND GAS TURBINE PLANT PROVIDED WITH SAID DEVICE

CROSS-REFERENCE TO RELATED APPLICATION

This application claims priority based on JP 2015-152152 filed in Japan on Jul. 31, 2015, of which the contents are incorporated herein by reference.

TECHNICAL FIELD

The present invention relates to a fuel flow rate setting method of a gas turbine provided with a plurality of premixing nozzles that spray a fuel to be combusted through premixed combustion, a device for implementing the method, and a gas turbine plant provided with the device.

BACKGROUND ART

A gas turbine includes a compressor that compresses air, a combustor that combusts a fuel in the air compressed by the compressor to generate combustion gas, and a turbine that is driven by the combustion gas. In many cases, the combustor includes a plurality of main burners that combust the fuel through premixed combustion. Each of the main burners includes a main nozzle and a gas channel frame inside which the main nozzle is disposed. Inside the gas channel frame, premixed gas is generated as a result of the fuel sprayed from the main nozzle and the air from the compressor being mixed. This premixed gas is sprayed from the gas channel frame into a combustion liner of the combustor.

Examples of the combustor provided with the plurality of main burners include a combustor disclosed in JP 2006-145073 A. In this combustor, in order to achieve combustion stability of the fuel, the number of main nozzles that supply the fuel is increased sequentially as load of the gas turbine increases.

SUMMARY OF INVENTION

Technical Problems

It is true that the technology disclosed in JP 2006-145073 A can achieve combustion stability of a fuel. However, in this technical field, there is demand for further improvement in the combustion stability.

In light of the foregoing, an object of the present invention is to provide a technology capable of improving combustion stability of a fuel in a gas turbine provided with a plurality of premixing nozzles that spray a fuel to be combusted through premixed combustion.

Solution to Problems

A fuel flow rate setting device according to a first aspect of the invention for achieving the above-described object is a fuel flow rate setting device of a gas turbine provided with a plurality of premixing nozzle groups each formed by at least one premixing nozzle that sprays a fuel to be combusted through premixed combustion. The fuel flow rate setting device includes: a flow rate ratio computing unit configured to accept a parameter having a correlation with a gas turbine output and to determine, using a predetermined flow rate ratio relationship between the parameter and a fuel flow rate ratio between the plurality of premixing nozzle groups, the fuel flow rate ratio corresponding to the accepted parameter; and a flow rate computing unit configured to determine a flow rate of the fuel to be supplied to each of the plurality of premixing nozzle groups, using the fuel flow rate ratio determined by the flow rate ratio computing unit. The flow rate ratio relationship is a relationship in which the fuel flow rate ratio changes continuously as the parameter changes.

A combustion oscillation region may occur in a region in which the gas turbine output is within a predetermined range and the fuel flow rate ratio between the plurality of premixing nozzle groups is within a predetermined range. Thus, in the fuel flow rate setting device, the occurrence of the combustion oscillation in the course of combusting the fuel is suppressed by changing the fuel flow rate ratio in accordance with the parameter having a correlation with the gas turbine output. Further, the predetermined flow rate ratio relationship between the parameter and the fuel flow rate ratio is a relationship in which the fuel flow rate ratio changes continuously as the parameter changes. Thus, in the fuel flow rate setting device, the fuel flow rate ratio does not suddenly change significantly. As a result, the fuel flow rate setting device can improve combustion stability of the fuel.

The fuel flow rate setting device according to a second aspect of the invention for achieving the above-described object is the fuel flow rate setting device according to the first aspect that further includes a valve controller that specifies an opening amount for a fuel flow rate adjustment valve provided for each of the plurality of premixing nozzle groups that adjusts a flow rate of the fuel to be supplied to the premixing nozzle group. Using the fuel flow rate for each of the plurality of premixing nozzle groups, the valve controller determines the opening amount for the fuel flow rate adjustment valve provided for each of the plurality of premixing nozzle groups.

The fuel flow rate setting device according to a third aspect of the invention for achieving the above-described object is the fuel flow rate setting device according to the first or second aspect in which the flow rate ratio relationship is a relationship determined in order to avoid a combustion oscillation region in which combustion oscillation occurs among regions defined by the parameter and the fuel flow rate ratio.

The fuel flow rate setting device according to a fourth aspect of the invention for achieving the above-described object is the fuel flow rate setting device according to any one of the first to third aspects that further includes:

a correction value computing unit that determines a correction value in relation to the fuel flow rate ratio applied when the gas turbine output is changing; and a corrector that corrects the fuel flow rate ratio determined by the flow rate ratio computing unit, using the correction value determined by the correction value computing unit. When the gas turbine output is changing, the flow rate computing unit determines the fuel flow rate for each of the plurality of premixing nozzle groups, using the fuel flow rate ratio corrected by the corrector.

When the gas turbine output is changing, the combustion oscillation region also changes in accordance with the change in the gas turbine output. Thus, in the fuel flow rate setting device, when the gas turbine output is changing, the combustion oscillation that occurs in the course of combusting the fuel is avoided by correcting the fuel flow rate ratio, in order to achieve the combustion stability of the fuel.

The fuel flow rate setting device according to a fifth aspect of the invention for achieving the above-described object is the fuel flow rate setting device according to the fourth aspect in which the correction value computing unit accepts the parameter and determines the correction value corresponding to the accepted parameter, using a predetermined correction value relationship between the parameter and the correction value.

The change in the combustion oscillation region, which occurs when the gas turbine output is changing, varies depending on the gas turbine output at the time. Thus, in the fuel flow rate setting device, the correction value is determined in accordance with the parameter having a correlation with the gas turbine output.

The fuel flow rate setting device according to a sixth aspect of the invention for achieving the above-described object is the fuel flow rate setting device according to the fifth aspect in which the correction value computing unit determines whether the change in the gas turbine output is an output increase or an output decrease. When the change in the gas turbine output is the output increase, the correction value computing unit determines the correction value using, as the correction value relationship, a correction value relationship applied at a time of the output increase. When the change in the gas turbine output is the output decrease, the correction value computing unit determines the correction value using, as the correction value relationship, a correction value relationship applied at a time of the output decrease.

Forms of the change in the gas turbine output include the output increase and the output decrease. The change in the combustion oscillation region is different between when the gas turbine output is increasing and when the gas turbine output is decreasing. Thus, in the fuel flow rate setting device, when the change in the gas turbine output is the output increase, the correction value is determined using the correction value relationship applied at a time of the output increase, and when the change in the gas turbine output is the output decrease, the correction value is determined using the correction value relationship applied at a time of the output decrease.

The fuel flow rate setting device according to a seventh aspect of the invention for achieving the above-described object is the fuel flow rate setting device according to the fifth or sixth aspect in which the correction value relationship is the fuel flow rate ratio corrected by the corrector and is a relationship determined so as to be able to avoid the combustion oscillation region in which combustion oscillation occurs when the gas turbine output is changing among regions defined by the parameter and the correction value.

The fuel flow rate setting device according to an eighth aspect of the invention for achieving the above-described object is the fuel flow rate setting device according to any one of the fifth to seventh aspects in which, among the plurality of premixing nozzle groups, one of the premixing nozzle groups has a greater number of premixing nozzles than the other premixing nozzle groups, and the correction value determined by the correction value relationship is a value that decreases the flow rate of the fuel to be supplied to the one of the premixing nozzle groups.

The fuel flow rate setting device according to a ninth aspect of the invention for achieving the above-described object is the fuel flow rate setting device according to any one of the first to eighth aspects that further includes a parameter generator that generates, as the parameter, an inlet temperature-correlated value having a positive correlation with a temperature of a turbine inlet, inside a turbine of the gas turbine, into which combustion gas from a combustor of the gas turbine flows.

The fuel flow rate setting device according to a tenth aspect of the invention for achieving the above-described object is the fuel flow rate setting device according to any one of the first to ninth aspects that further includes a total premixed fuel computing unit that determines a flow rate of the fuel to be supplied to all of the plurality of premixing nozzle groups. The flow rate computing unit determines a fuel flow rate for each of the plurality of premixing nozzle groups, using the fuel flow rate determined by the total premixed fuel computing unit and the fuel flow rate ratio determined by the flow rate ratio computing unit.

A gas turbine plant according to an eleventh aspect of the invention for achieving the above-described object includes:

the fuel flow rate setting device according to any one of the first to tenth aspects; and the gas turbine. The gas turbine includes: a compressor that compresses air; a combustor that combusts a fuel in the air compressed by the compressor to generate combustion gas; and a turbine that is driven by the combustion gas. The combustor includes: a combustion liner in which the fuel is combusted; and a plurality of main burners that spray premixed gas which is formed by mixing a fuel and air into the combustion liner. Each of the plurality of main burners includes: one main nozzle as the premixing nozzle; and a gas channel frame that generates the premixed gas by mixing the fuel sprayed from the one main nozzle and the air compressed by the compressor and sprays the premixed gas into the combustion liner. The combustor includes a plurality of main burner groups each formed by at least one of the main burners. The fuel flow rate setting device determines a fuel flow rate for each of the plurality of main burner groups.

A gas turbine plant according to a twelfth aspect of the invention for achieving the above-described object includes:

the fuel flow rate setting device according to any one of the first to tenth aspects; and the gas turbine. The gas turbine includes: a compressor that compresses air; a combustor that combusts a fuel in the air compressed by the compressor to generate combustion gas; and a turbine that is driven by the combustion gas. The combustor includes: a combustion liner in which the fuel is combusted; a plurality of main burners that spray premixed gas which is formed by mixing a fuel and the air from the compressor into the combustion liner; and a plurality of top hat nozzles, as the premixing nozzles, which spray the fuel into the air from the compressor, the air flowing into the main burners. The combustor includes a plurality of top hat nozzle groups each formed by at least one of the top hat nozzles. The fuel flow rate setting device determines a fuel flow rate for each of the plurality of top hat nozzle groups.

A fuel flow rate setting method according to a thirteenth aspect of the invention for achieving the above-described object is a fuel flow rate setting method of a gas turbine provided with a plurality of premixing nozzle groups each formed by at least one premixing nozzle that sprays a fuel to be combusted through premixed combustion. The fuel flow rate setting method includes: a flow rate ratio computing step of accepting a parameter having a correlation with a gas turbine output and determining, using a predetermined flow rate ratio relationship between the parameter and a fuel flow rate ratio between the plurality of premixing nozzle groups, the fuel flow rate ratio corresponding to the accepted parameter; and a flow rate computing step of determining, using the fuel flow rate ratio determined at the flow rate ratio computing step, a fuel flow rate for each of the plurality of premixing nozzle groups. The flow rate ratio relationship is a relationship in which the fuel flow rate ratio changes continuously as the parameter changes.

The combustion oscillation region may occur in the region in which the gas turbine output is within the predetermined range and the fuel flow rate ratio between the plurality of premixing nozzle groups is within the predetermined range. Thus, in the fuel flow rate setting method, the occurrence of the combustion oscillation in the course of combusting the fuel is suppressed by changing the fuel flow rate ratio in accordance with the parameter having a correlation with the gas turbine output. Further, the predetermined flow rate ratio relationship between the parameter and the fuel flow rate ratio is a relationship in which the fuel flow rate ratio changes continuously as the parameter changes. Thus, in the fuel flow rate setting method, the fuel flow rate ratio does not suddenly change significantly. As a result, the fuel flow rate setting method can improve the combustion stability of the fuel.

The fuel flow rate setting method according to a fourteenth aspect of the invention for achieving the above-described object is the fuel flow rate setting method according to the thirteenth aspect that further includes a valve controlling step of specifying an opening amount for a fuel flow rate adjustment valve provided for each of the plurality of premixing nozzle groups that adjusts a flow rate of the fuel to be supplied to the premixing nozzle group. At the valve controlling step, the opening amount for the fuel flow rate adjustment valve provided for each of the plurality of premixing nozzle groups is determined using the fuel flow rate for each of the plurality of premixing nozzle groups.

The fuel flow rate setting method according to a fifteenth aspect of the invention for achieving the above-described object is the fuel flow rate setting method according to the thirteenth or fourteenth aspect in which a combustion oscillation region in which combustion oscillation occurs among regions defined by the parameter and the fuel flow rate ratio is identified in advance, and the flow rate ratio relationship is a relationship determined such that the fuel flow rate ratio corresponding to the parameter avoids the combustion oscillation region.

The fuel flow rate setting method according to a sixteenth aspect of the invention for achieving the above-described object is the fuel flow rate setting method according to any one of the thirteenth to fifteenth aspects that further includes: a correction value computing step of determining a correction value in relation to the fuel flow rate ratio applied when the gas turbine output is changing; and a correcting step of correcting the fuel flow rate ratio determined at the flow rate ratio computing step, using the correction value determined at the correction value computing step. At the flow rate computing step, when the gas turbine output is changing, a fuel flow rate for each of the plurality of premixing nozzle groups is determined using the fuel flow rate ratio corrected at the correcting step.

When the gas turbine output is changing, the combustion oscillation region also changes in accordance with the change in the gas turbine output. Thus, in the fuel flow rate setting method, when the gas turbine output is changing, the combustion oscillation that occurs in the course of combusting the fuel is avoided by correcting the fuel flow rate ratio, in order to achieve the combustion stability of the fuel.

The fuel flow rate setting method according to a seventeenth aspect of the invention for achieving the above-described object is the fuel flow rate setting method according to the sixteenth aspect in which, at the correction value computing step, the parameter is accepted and the correction value corresponding to the accepted parameter is determined using a predetermined correction value relationship between the parameter and the correction value.

The fuel flow rate setting method according to an eighteenth aspect of the invention for achieving the above-described object is the fuel flow rate setting method according to the seventeenth aspect in which, at the correction value computing step, whether the change in the gas turbine output is an output increase or an output decrease is determined. When the change in the gas turbine output is the output increase, the correction value is determined using, as the correction value relationship, a correction value relationship applied at a tune of the output increase. When the change in the gas turbine output is the output decrease, the correction value is determined using, as the correction value relationship, a correction value relationship applied at a time of the output decrease.

The fuel flow rate setting method according to a nineteenth aspect of the invention for achieving the above-described object is the fuel flow rate setting method according to the seventeenth or eighteenth aspect in which a combustion oscillation region in which combustion oscillation occurs when the gas turbine output is changing among regions defined by the parameter and the correction value is identified in advance, and the correction value relationship is a relationship determined such that the fuel flow rate ratio after the correcting step is able to avoid the combustion oscillation region.

The fuel flow rate setting method according to a twentieth aspect of the invention for achieving the above-described object is the fuel flow rate setting method according to any one of the seventeenth to nineteenth aspects in which, among the plurality of premixing nozzle groups, one of the premixing nozzle groups has a greater number of premixing nozzles than the other premixing nozzle groups, and the correction value determined by the correction value relationship is a value that decreases the flow rate of the fuel to be supplied to the one of the premixing nozzle groups.

The fuel flow rate setting method according to a twenty-first aspect of the invention for achieving the above-described object is the fuel flow rate setting method according to any one of the thirteenth to twentieth aspects that further includes a parameter generating step of generating, as the parameter, an inlet temperature-correlated value having a positive correlation with a temperature of a turbine inlet, inside a turbine of the gas turbine, into which combustion gas from a combustor of the gas turbine flows.

Advantageous Effects of Invention

According to an aspect of the present invention, combustion stability of a fuel can be improved in a gas turbine provided with a plurality of premixing nozzles that spray the fuel to be combusted through premixed combustion.

DESCRIPTION OF EMBODIMENT

An embodiment and a modified example of a fuel flow rate setting device according to the present invention and of a gas turbine plant provided with the device will be described below with reference to the drawings.

Embodiment

Figure 1:
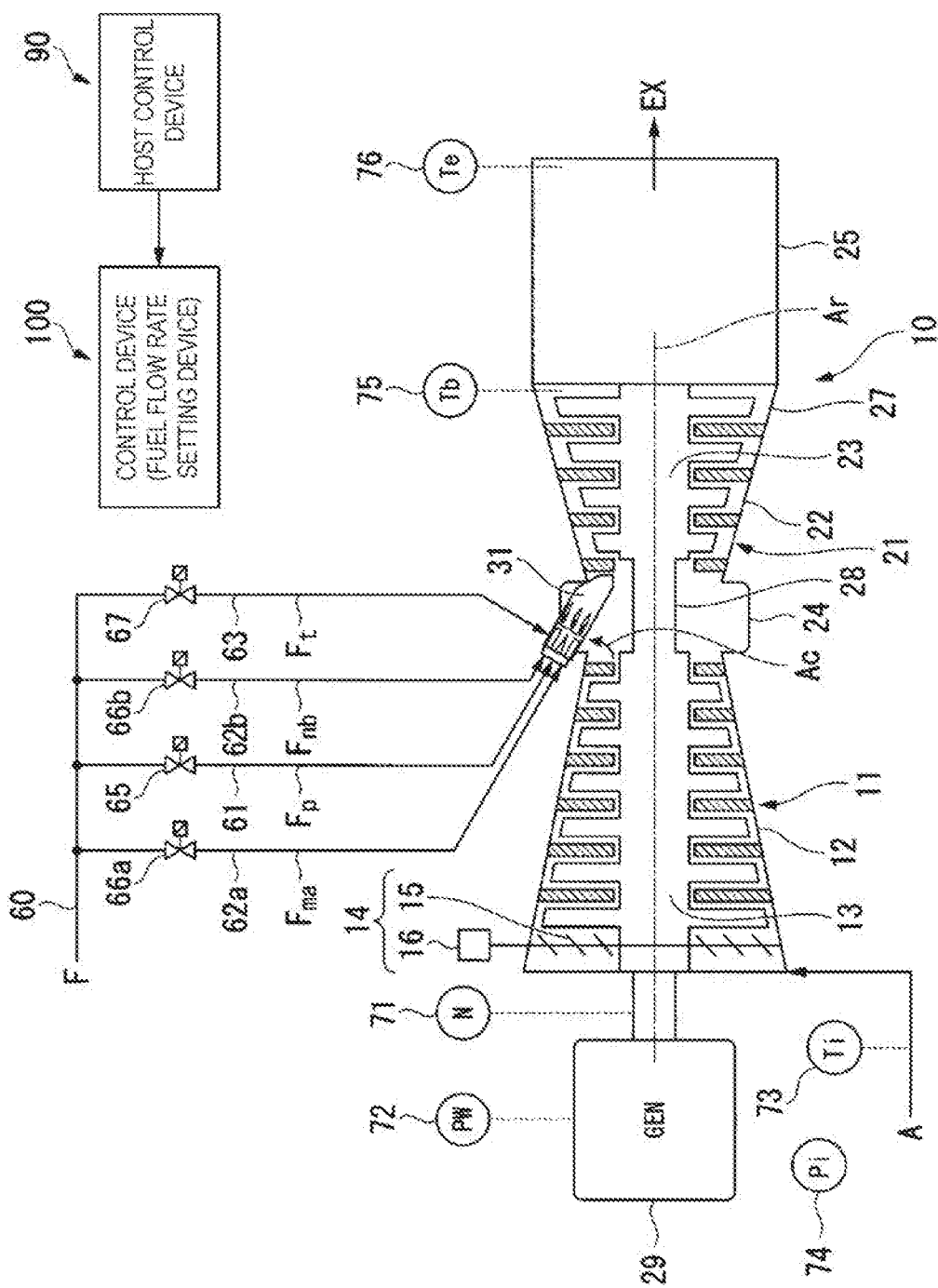
FIG. 1 is a system diagram illustrating a gas turbine plant according to an embodiment of the present invention.

The gas turbine plant according to the present embodiment includes a gas turbine 10 and a generator 29 that generates power by being driven by the gas turbine 10, as illustrated in FIG. 1.

The gas turbine 10 includes a compressor 11 that compresses air, a combustor 31 that combusts a fuel F in the air compressed by the compressor 11 to generate combustion gas, and a turbine 21 that is driven by the high-temperature high-pressure combustion gas.

The compressor 11 includes a compressor rotor 13 that rotates around an axis Ar, a compressor casing 12 that covers the compressor rotor 13 while allowing the compressor rotor 13 to rotate, and an inlet guide vane (IGV) 14 provided at an intake port of the compressor casing 12. The IGV 14 includes a plurality of guide vanes 15 and a driver 16 that drives the plurality of guide vanes 15. This IGV 14 adjusts a flow rate of the air taken into the compressor casing 12.

The turbine 21 includes a turbine rotor 23 that is rotated around the axis Ar by the combustion gas from the combustor 31, and a turbine casing 22 that covers the turbine rotor 23 while allowing the turbine rotor 23 to rotate. The turbine rotor 23 and the compressor rotor 13 rotate around the same axis Ar, and are connected to each other to form a gas turbine rotor 28. A rotor of the generator 29 is connected to the gas turbine rotor 28.

The gas turbine 10 further includes an intermediate casing 24 and an exhaust duct 25. The intermediate casing 24 is disposed between the compressor casing 12 and the turbine casing 22 so as to connect the compressor casing 12 and the turbine casing 22. The exhaust duct 25 is connected to the turbine casing 22, and an exhaust gas EX, which is the combustion gas that has passed through the interior of the turbine casing 22, flows through the exhaust duct 25. The compressor casing 12, the intermediate casing 24, and the turbine casing 22 are connected to one another to form a gas turbine casing 27. The combustor 31 is fixed to the intermediate casing 24.

Figure 2:
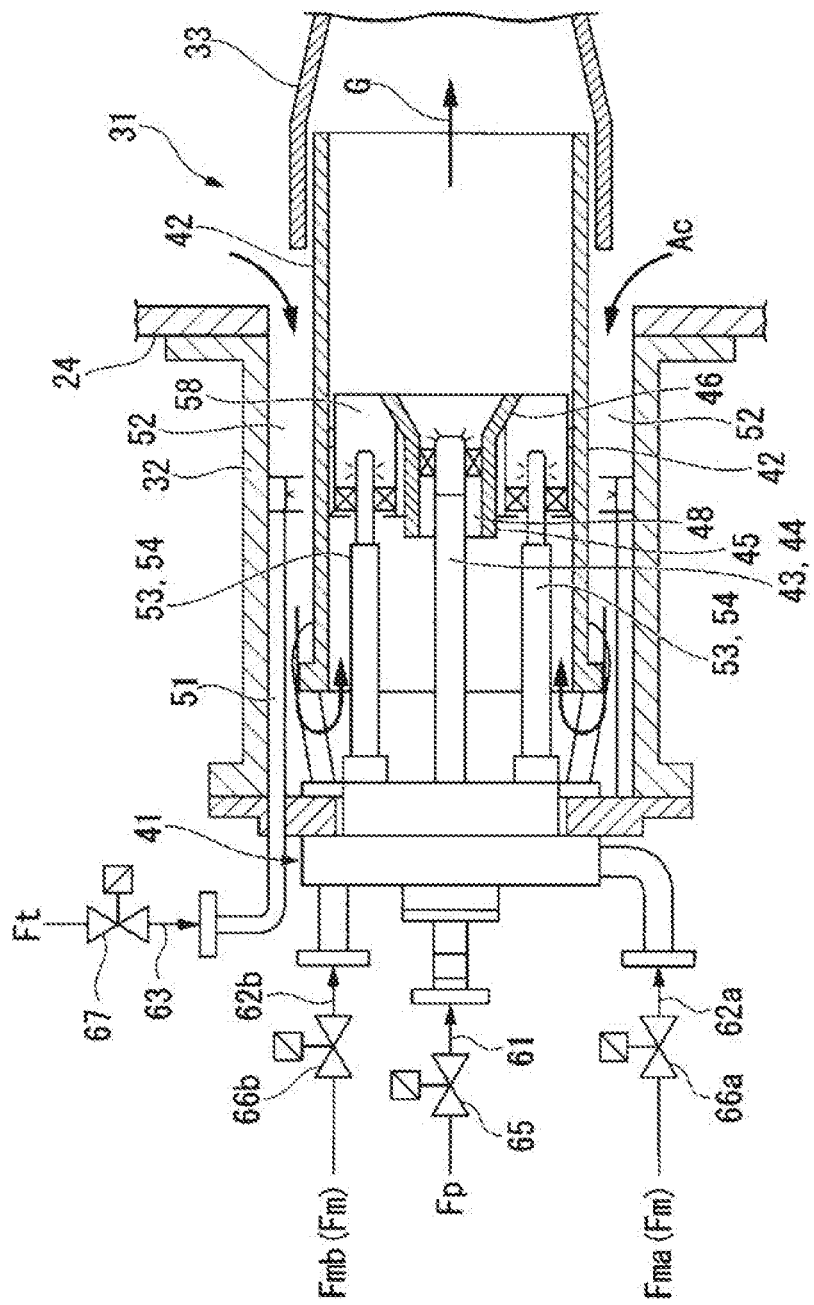
FIG. 2 is a cross-sectional view of a combustor according to the embodiment of the present invention.

The combustor 31 includes an external cylinder 32, a combustion liner (or a transition piece) 33, and a fuel feeder 41, as illustrated in FIG. 2. The external cylinder 32 is fixed to the intermediate casing 24. The combustion liner 33 is disposed inside the intermediate casing 24 and supplies the combustion gas into a combustion gas channel of the turbine 21. The fuel feeder 41 feeds the fuel and the air into the combustion liner 33.

Figure 3:
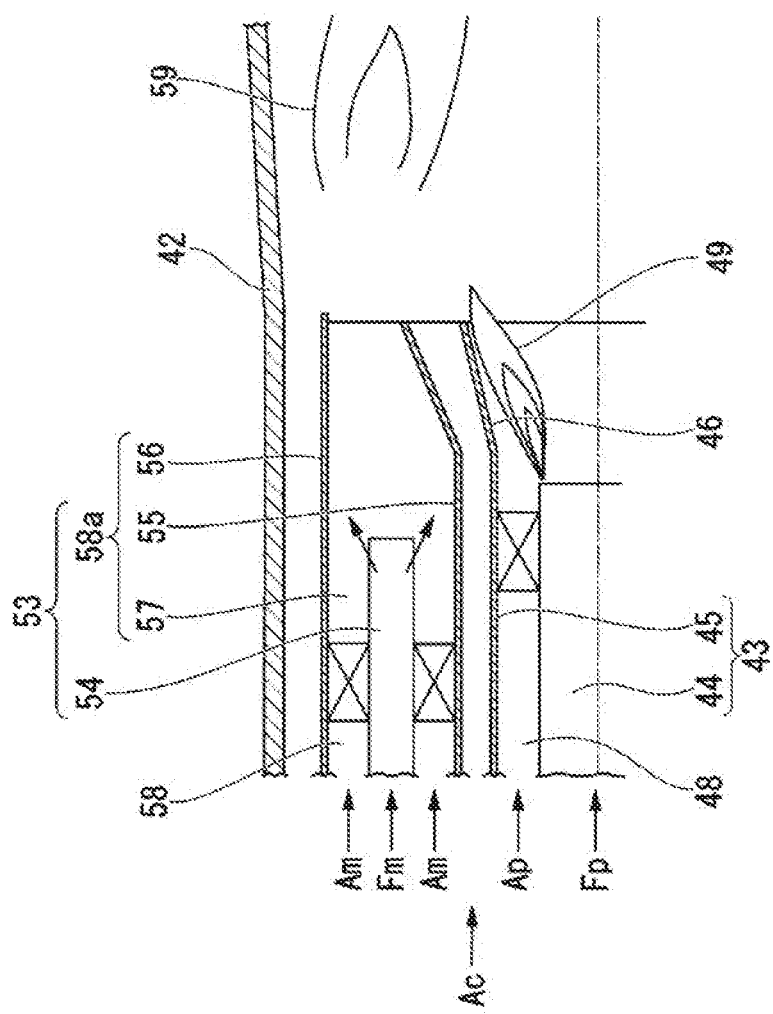
FIG. 3 is a cross-sectional view illustrating a main portion of the combustor according to the embodiment of the present invention.
Figure 4:
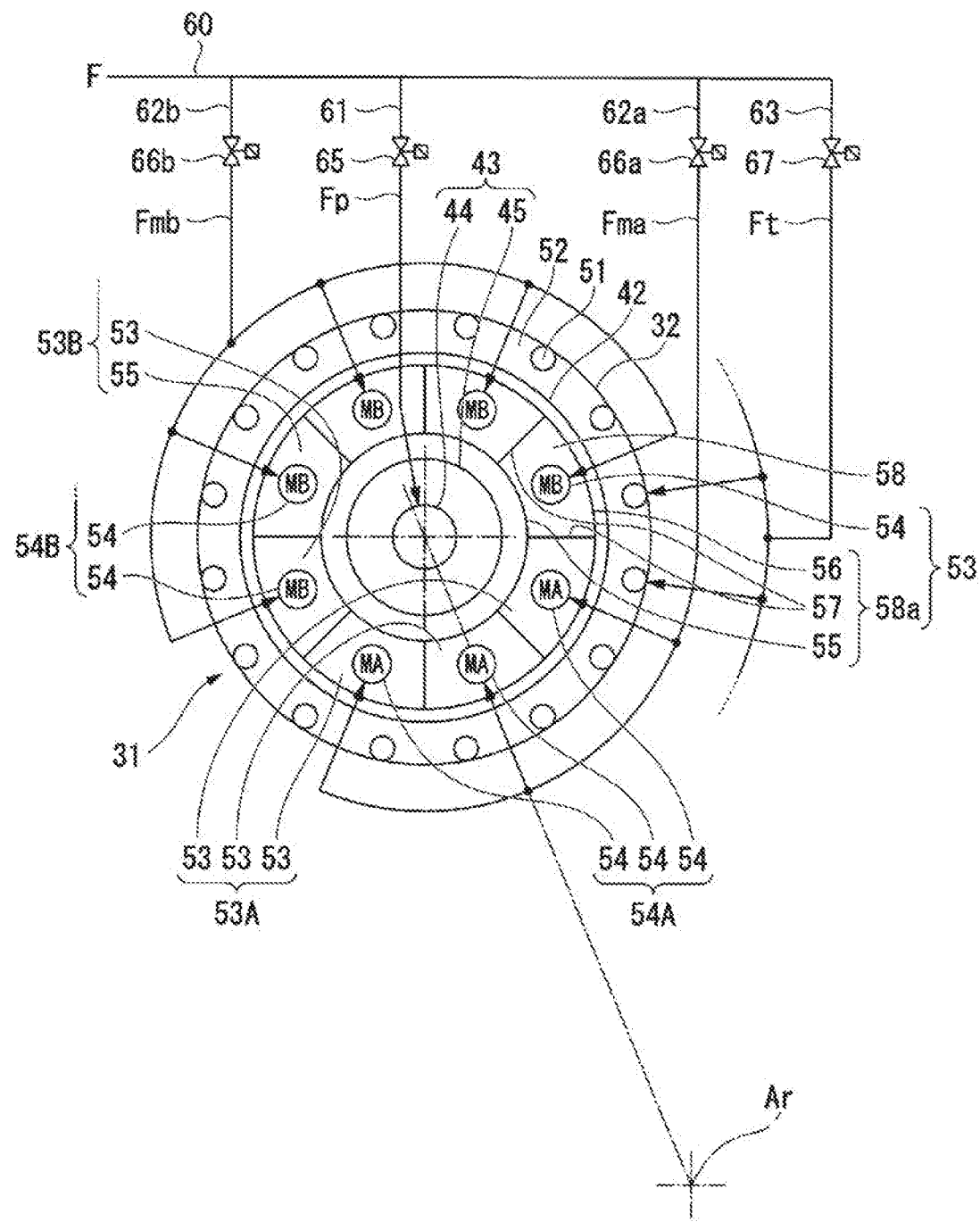
FIG. 4 is a schematic diagram illustrating a fuel feeder according to the embodiment of the present invention, when viewed from an axial direction thereof.

The fuel feeder 41 includes a combustor basket 42, a pilot burner 43, a plurality of main burners 53, and a top hat nozzle 51, as illustrated in FIG. 2 to FIG. 4. The pilot burner 43 is disposed on the central axis of the combustor basket 42. The plurality of main burners 53 are disposed in the circumferential direction at equal intervals so as to be centered around the pilot burner 43. The top hat nozzle 51 is disposed on the inner circumferential side of the external cylinder 32 and on the outer circumferential side of the combustor basket 42. Note that in the following description, in a direction in which the central axis of the combustor basket 42 extends, a side toward which combustion gas G flows inside the combustion liner 33 will be referred to as a "downstream side", and the side opposite thereto will be referred to as an "upstream side".

The pilot burner 43 includes a pilot nozzle 44 disposed on the central axis of the combustor basket 42 and a tubular pilot air tube 45 that surrounds the outer circumference of the pilot nozzle 44. The downstream side of the pilot air tube 45 forms a pilot cone 46 whose diameter gradually becomes greater toward the downstream side. The inner circumferential side of the pilot air tube 45 forms a pilot air channel 48 through which compressed air Ac from the compressor 11 flows as pilot air Ap. A pilot fuel Fp sprayed from the pilot nozzle 44 is combusted (through diffusion combustion) in the pilot air Ap sprayed from the pilot air channel 48 to form a diffusion flame 49 (see FIG. 3)

Each of the main burners 53 includes a main air combustor basket 55, a main air external cylinder 56, a partition plate 57, and a main nozzle 54. The main air combustor basket 55 is formed in a tubular shape so as to surround the outer circumference of the pilot air tube 45. The main air external cylinder 56 is formed in a tubular shape so as to surround the outer circumference of the main air combustor basket 55. The partition plate 57 is disposed in an annular space between the outer circumferential side of the main air combustor basket 55 and the inner circumferential side of the main air external cylinder 56 and divides the annular space into a plurality of spaces in the circumferential direction. The main nozzles 54 are each disposed between the plurality of partition plates 57. A gas channel frame 58a in each of the main burners 53 is formed by the main air combustor basket 55, the main air external cylinder 56, and a pair of the partition plates 57 adjacent to each other in the circumferential direction. The plurality of spaces defined by the main air combustor basket 55, the main air external cylinder 56, and the plurality of partition plates 57 form a main air channel 58 through which the compressed air Ac from the compressor 11 flows as main air Am. A main fuel Fm is sprayed from the main nozzles 54 disposed inside the main air channel 58 into the main air Am flowing through the main air channel 58. As a result, premixed gas, which is a mixture of the main air Am and the main fuel Fm, flows in the main air channel 58 further to the downstream side than a tip end portion (downstream end) of the main nozzle 54. After being sprayed out of the main air channel 58, this premixed gas is combusted (through premixed combustion) and a premixed flame 59 is formed (see FIG. 3). Thus, the main nozzles 54 of the present embodiment are premixing nozzles. The above-described diffusion flame 49 plays a role of stabilizing this premixed flame 59.

The combustor 31 of the present embodiment has eight of the main burners 53, as illustrated in FIG. 4. Of the eight main burners 53, three of the main burners 53, which are disposed on a side closer to the axis Ar of the gas turbine rotor 28 and adjacent to each other in the circumferential direction, form a main burner A group 53A. Further, the remaining five of the main burners 53 form a main burner B group 53B. The main nozzles 54 in the three main burners 53, which form the main burner A group 53A, form a main nozzle A group 54A, and the main nozzles 54 in the five main burners 53, which form the main burner B group 53B, form a main nozzle B group 54B.

A space between the inner circumferential side of the external cylinder 32 and the outer circumferential side of the combustor basket 42 forms a compressed air channel 52 that guides the compressed air Ac from the compressor 11 into the combustor basket 42. The top hat nozzle 51 sprays a top hat fuel Ft into this compressed air channel 52. Thus, when the top hat fuel Ft is sprayed into the compressed air channel 52, the top hat fuel Ft is mixed into the main air Am and the pilot air Ap. Thus, the top hat nozzles 51 of the present embodiment are also premixing nozzles.

As illustrated in FIG. 1, FIG. 2, and FIG. 4, the gas turbine plant of the present embodiment further includes: a fuel main line 60 through which the fuel F supplied to the combustor 31 flows; a pilot fuel line 61 that supplies the pilot fuel Fp to the pilot nozzle 44; a main A fuel line 62a that supplies a main A fuel Fma to the main nozzle A group 54A; a main B fuel line 62b that supplies a main B fuel Fmb to the main nozzle B group 54B; a top hat fuel line 63 that supplies the top hat fuel Ft to the top hat nozzles 51; a pilot fuel valve 65 that adjusts a flow rate of the pilot fuel Fp; a main A fuel valve 66a that adjusts a flow rate of the main A fuel Fma; a main B fuel valve 66b that adjusts a flow rate of the main B fuel Fmb; and a top hat fuel valve 67 that adjusts a flow rate of the top hat fuel Ft.

The pilot fuel line 61, the main A fuel line 62a, the main B fuel line 62b, and the top hat fuel line 63 are all lines branching out from the fuel main line 60. The pilot fuel valve 65 is provided in the pilot fuel line 61. The main A fuel line 62a includes a main line and a plurality of diverging lines that branch out from the main line. The plurality of diverging lines are provided respectively for the three main nozzles 54 that form the main nozzle A group 54A. The main A fuel valve 66a is provided in the main line of the main A fuel line 62a. The main B fuel line 62b includes a main line and a plurality of diverging lines that branch out from the main line. The plurality of diverging lines are provided respectively for the five main nozzles 54 that form the main nozzle B group 54B. The main B fuel valve 66b is provided in the main line of the main B fuel line 62b. The top hat fuel line 63 includes a main line and a plurality of diverging lines that branch out from the main line. The plurality of diverging lines are provided respectively for the plurality of top hat nozzles 51. The top hat fuel valve 67 is provided in the main line of the top hat fuel line 63.

As illustrated in FIG. 1, the gas turbine plant of the present embodiment further includes a control device (a fuel flow rate setting device) 100, a rotational frequency gauge 71, an output gauge 72, an intake temperature gauge 73, an intake pressure gauge 74, a blade path temperature gauge 75, and an exhaust gas temperature gauge 76. The control device 100 controls operations and the like of the above-described fuel valves 65, 66a, 66b, and 67. The rotational frequency gauge 71 detects a rotational frequency N of the gas turbine rotor 28. The output gauge 72 detects an output PW of the generator 29. The intake temperature gauge 73 detects an intake temperature Ti that is a temperature of air A taken in by the compressor 11.

The intake pressure gauge 74 detects an intake pressure (atmospheric pressure) Pi that is a pressure of the air taken in by the compressor 11. The blade path temperature gauge 75 detects a blade path temperature Tb that is a temperature of the combustion gas that has just passed through the final stage of the turbine 21. The exhaust gas temperature gauge 76 detects a temperature Te of the exhaust gas inside the exhaust duct, further to the downstream side than the final stage of the turbine 21.

Figure 5:
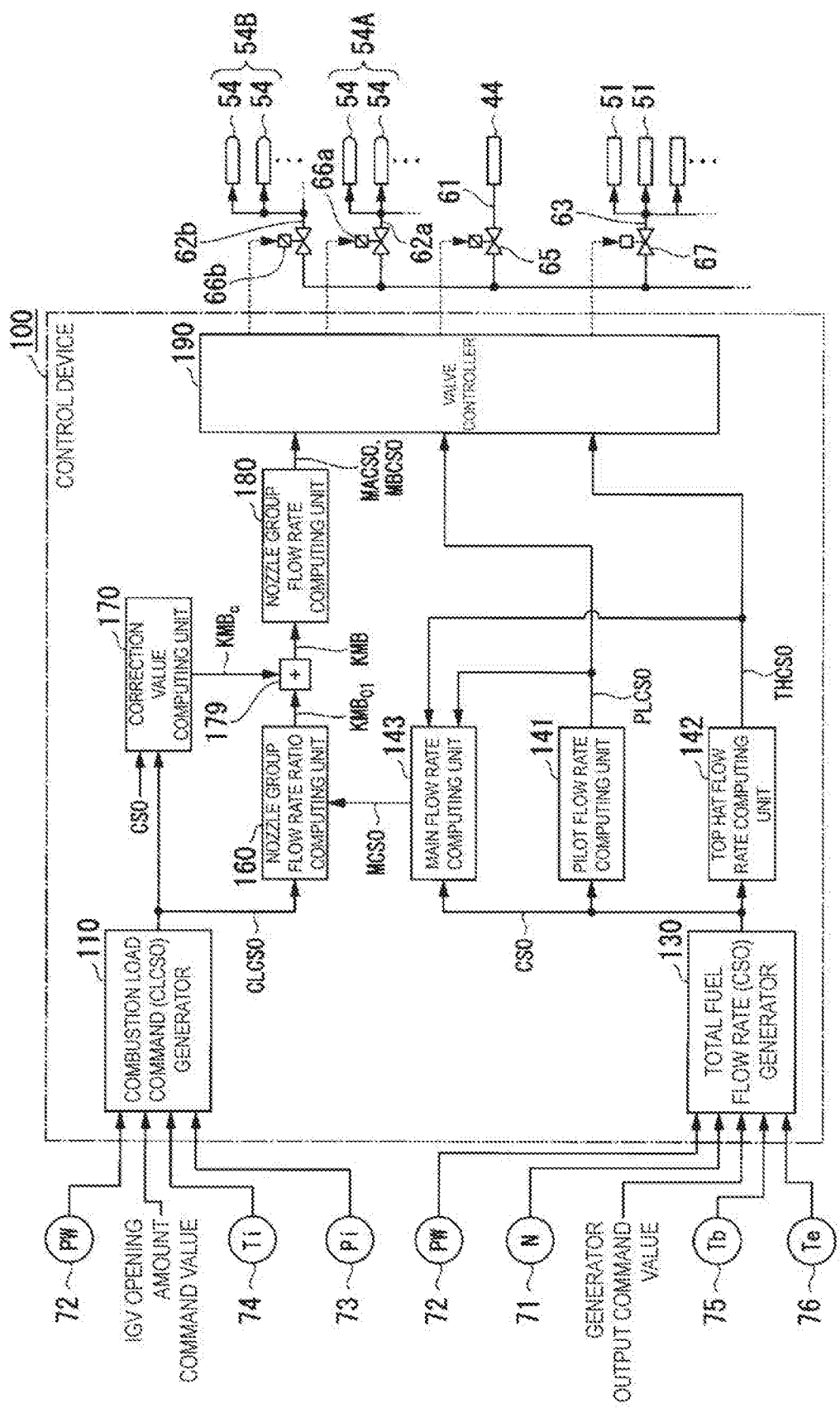
FIG. 5 is a function block diagram of a control device according to the embodiment of the present invention.

As illustrated in FIG. 5, the control device 100 includes a combustion load command generator (a parameter generator) 110, a total fuel flow rate generator 130, a pilot flow rate computing unit 141, a top hat flow rate computing unit 142, a main flow rate computing unit (a total premixed fuel computing unit) 143, a nozzle group flow rate ratio computing unit (simply, a flow rate ratio computing unit) 160, a correction value computing unit 170, a corrector 179, a nozzle group flow rate computing unit (simply, a flow rate computing unit) 180, and a valve controller 190.

The combustion load command generator 110 generates a combustion load command value CLCSO (a parameter generating step). The total fuel flow rate generator 130 generates a total fuel flow rate command value CSO. The pilot flow rate computing unit 141 determines a pilot flow rate command value PLCSO, which is a flow rate of the pilot fuel Fp supplied to the pilot nozzle 44. The top hat flow rate computing unit 142 determines a top hat flow rate THCSO, which is a flow rate of the top hat fuel Ft supplied to all the top hat nozzles 51. The main flow rate computing unit 143 determines a main flow rate MCSO, which is a flow rate of the main fuel Fm supplied to all the main nozzles 54. The nozzle group flow rate ratio computing unit 160 determines a nozzle group flow rate ratio $KMB_{01}$, which is a flow rate ratio between the main A fuel Fma supplied to the main nozzle A group 54A and the main B fuel Fmb supplied to the main nozzle B group 54B. The correction value computing unit 170 determines a correction value KMBc of the nozzle group flow rate ratio $KMB_{01}$ determined by the nozzle group flow rate ratio computing unit 160. The corrector 179 corrects the nozzle group flow rate ratio $KMB_{01}$ determined by the nozzle group flow rate ratio computing unit 160, using the correction value KMBc determined by the correction value computing unit 170. The nozzle group flow rate computing unit 180 determines a main A flow rate MACSO of the main A fuel Fma supplied to the main nozzle A group 54A and a main B flow rate MBCSO of the main B fuel Fmb supplied to the main nozzle B group 54B, in accordance with the nozzle group flow rate ratio KMB corrected by the corrector 179. The valve controller 190 determines an opening amount for each of the fuel valves 65, 66a, 66b, and 67 in accordance with the flow rate of the fuel valves 65, 66a, 66b, and 67 determined by each of the flow rate computing units 141, 142, and 180, and specifies the opening amount for each of the fuel valves 65, 66a, 66b, and 67.

The combustion load command value CLCSO is a parameter that is an inlet temperature of the combustion gas in the turbine 21 when the inlet temperature is made dimensionless, and is a parameter having a positive correlation with the inlet temperature. Further, the combustion load command value CLCSO is also a parameter having a correlation with a gas turbine output. The combustion load command value CLCSO is set to be 0% when the inlet temperature is at a lower limit value and to be 100% when the inlet temperature is at an upper limit value. For example, when the lower limit value of the inlet temperature is 700° C. and the upper limit value of the inlet temperature is 1500° C., the combustion load command value CLCSO is expressed by Equation (1) below.

$$\text{CLCSO (\%)} = \{(\text{Measured value of generator output} - 700° \text{ CMW})/(1500° \text{ CMW} - 700° \text{ CMW})\} \times 100 \quad (1)$$

Note that 700° CMW is the generator output when the inlet temperature is the lower limit value of 700° C. Further, 1500° CMW is the generator output when the inlet temperature is the upper limit value of 1500° C.

Figure 6:
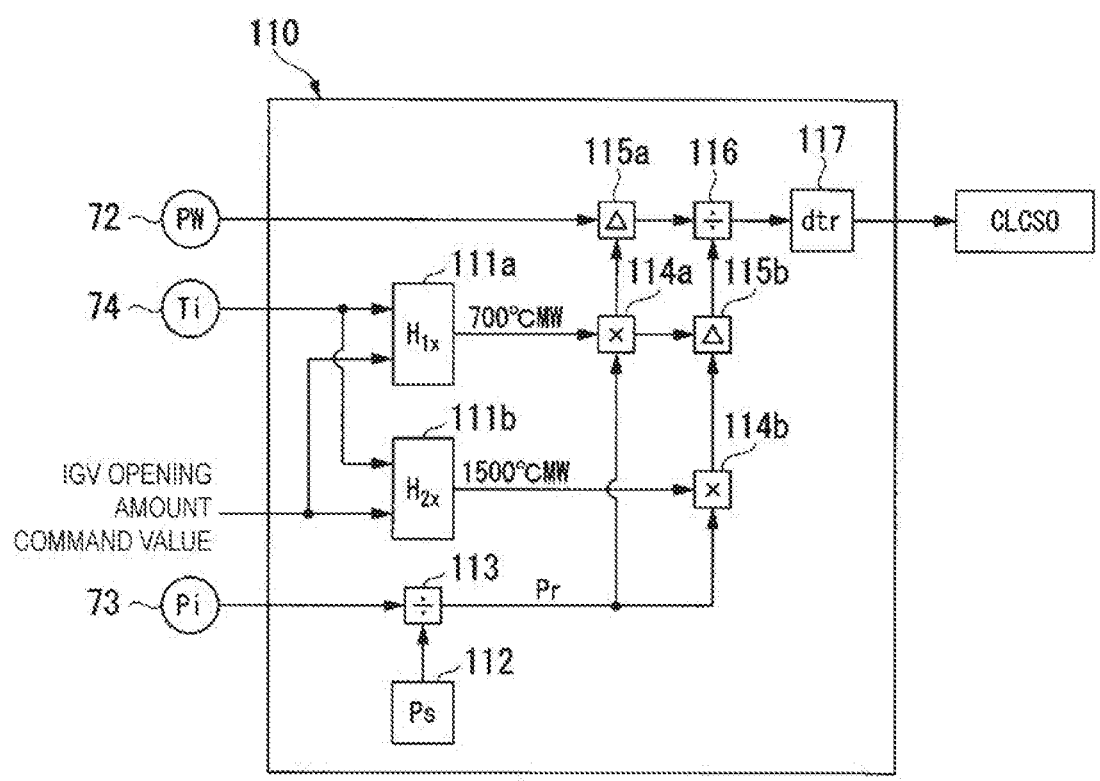
FIG. 6 is a function block diagram of a combustion load command generator according to the embodiment of the present invention.

As illustrated in FIG. 6, the combustion load command generator 110 includes a first output computing unit 111a, a second output computing unit 111b, a standard atmospheric pressure generator 112, a first divider 113, a first multiplier 114a, a second multiplier 114b, a first subtractor 115a, a second subtractor 115b, a second divider 116, and a limiter 117. The first output computing unit 111a determines the generator output 700° CMW occurring when the inlet temperature is at its lower limit of 700° C. The second output computing unit 111b determines the generator output 1500° CMW occurring when the inlet temperature is at its upper limit value of 1500° C. The standard atmospheric pressure generator 112 generates a preset standard atmospheric pressure Ps. The first divider 113 determines an intake pressure ratio Pr, which is a ratio of the intake pressure Pi detected by the intake pressure gauge 74 to the standard atmospheric pressure (standard intake pressure) Ps. The first multiplier 114a multiplies the generator output 700° CMW determined by the first output computing unit 111a, by the intake pressure ratio Pr. The second multiplier 114b multiplies the generator output 1500° CMW determined by the second output computing unit 111b, by the intake pressure ratio Pr. The first subtractor 115a subtracts the multiplication result obtained by the first multiplier 114a from a measured output PW of the generator 29 detected by the output gauge 72. The second subtractor 115b subtracts the multiplication result obtained by the first multiplier 114a from the multiplication result obtained by the second multiplier 114b. The second divider 116 divides the subtraction result obtained by the first subtractor 115a by the subtraction result obtained by the second subtractor 115b. The limiter 117 limits an increase/decrease rate of the output from the second divider 116.

The first output computing unit 111a determines the generator output 700° CMW occurring when the inlet temperature is 700° C., using a function H1x with the intake temperature Ti and an IGV opening amount command value serving as fluctuating parameters. Further, the second output computing unit 111b determines the generator output 700° CMW occurring when the inlet temperature is 1500° C., using a function H2x with the intake temperature Ti and the IGV opening amount command value serving as fluctuating parameters. Here, the IGV opening amount command value is a command value given to the driver 16 of the IGV 14 by the control device 100. This IGV opening amount command value is determined, for example, on the basis of the atmospheric pressure Pi, which is a pressure at an inlet of the compressor 11, a pressure at an outlet of the compressor 11, and the like. The output computing units 111a and 111b change the known values of 700° CMW and 1500° CMW, obtained when the intake temperature and the IGV opening amount command value are reference values, respectively, to values corresponding to the measured intake temperature Ti and IGV opening amount command value, and output the changed values as 700° CMW and 1500° CMW.

Those 700° CMW and 1500° CMW are further corrected on the basis of the measured value Pi of the intake pressure (atmospheric pressure). Specifically, the first divider 113 determines the intake pressure ratio Pr, which is a ratio of the intake pressure (atmospheric pressure) Pi detected by the intake pressure gauge 74 to the standard intake pressure (standard atmospheric pressure) Ps from the standard atmospheric pressure generator 112. The first multiplier 114a multiplies the 700° CMW from the first output computing unit 111a by the intake pressure ratio Pr, and corrects the 700° CMW to be a value corresponding to the intake pressure ratio Pr. The second multiplier 114b multiplies the 1500° CMW from the second output computing unit 111b by the intake pressure ratio Pr, and corrects the 1500° CMW to be a value corresponding to the intake pressure ratio Pr. In other words, in the configuration described above, the known values of 700° CMW and 1500° CMW, obtained when the intake temperature and the IGV opening amount command value are the reference values, are corrected to be the values corresponding to the measured intake temperature Ti and IGV opening amount command value, and the measured intake pressure ratio Pr.

The first subtractor 115a subtracts the 700° CMW corrected by the intake pressure ratio Pr from the measured output PW of the generator 29 detected by the output gauge 72. In other words, the first subtractor 115a determines a value of the numerator in the above-described equation. The second subtractor 115b subtracts the 700° CMW corrected by the intake pressure ratio Pr from the 1500° CMW corrected by the intake pressure ratio PE In other words, the second subtractor 115b determines a value of the denominator in the above-described equation.

The second divider 116 divides the value of the numerator in the above-described equation, which has been determined by the first subtractor 115a, by the value of the denominator in the above-described equation, which has been determined by the second subtractor 115b, and outputs the resulting value as the combustion load command value. The limiter 117 limits the increase/decrease rate of the combustion load command value, which is an amount of change of the combustion load command value from the second divider 116 per unit time, such that the increase/decrease rate becomes equal to or less than a predetermined value.

In the description above, the lower limit value of the inlet temperature of the combustion gas in the turbine 21 is set to 700° C., and the upper limit value of the same is set to 1500° C. However, depending on the model type of the combustor 31 and the like, the lower limit value and the upper limit value of the inlet temperature of the combustion gas in the turbine 21 may be set to different values from those used in the above-described example.

Figure 7:
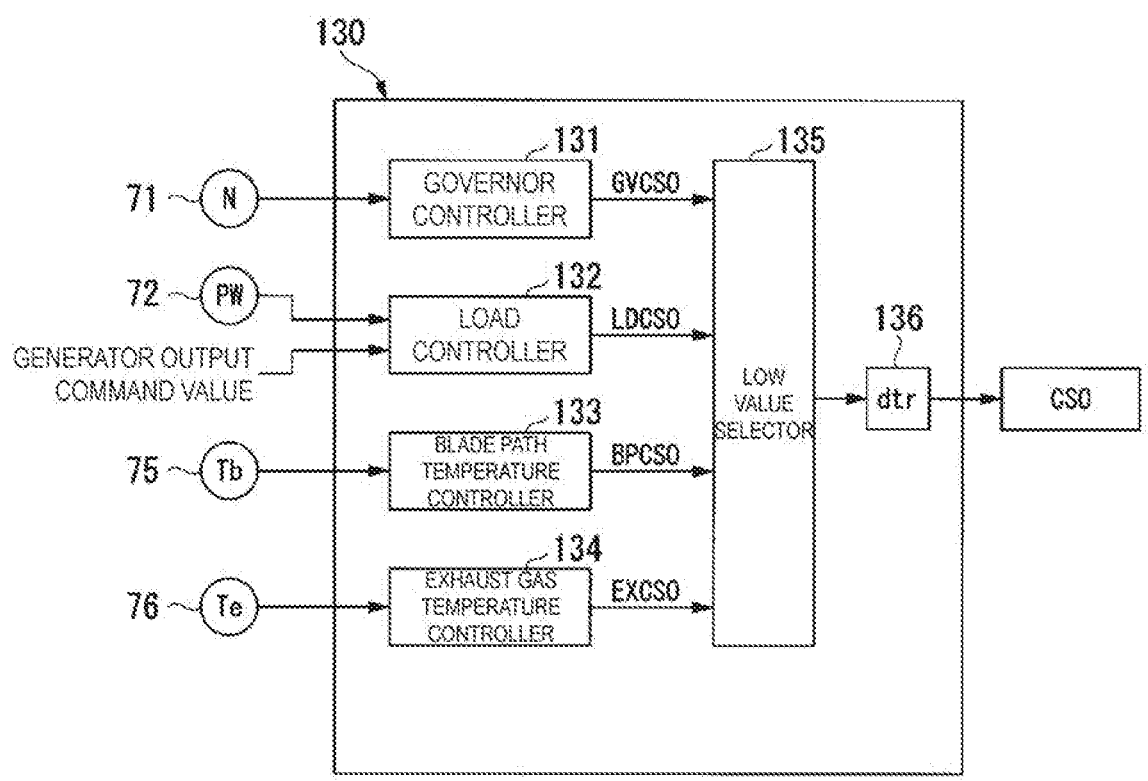
FIG. 7 is a function block diagram of a total fuel flow rate generator according to the embodiment of the present invention.

The total fuel flow rate command value CSO is a command value indicating a total flow rate of the fuel F supplied to the combustor 31. As illustrated in FIG. 7, the total fuel flow rate generator 130 includes a governor controller 131, a load controller 132, a first temperature controller 133, a second temperature controller 134, a low value selector 135, and a limiter 136. The governor controller 131 outputs a command value GVCSO for adjusting the total fuel flow rate command value CSO such that the rotational frequency N of the gas turbine rotor 28 becomes a target rotational frequency. The load controller 132 outputs a command value LDCSO for adjusting the total fuel flow rate command value CSO such that the measured output PW of the generator 29 matches a generator output command value. The first temperature controller 133 outputs a command value BPCSO for adjusting the total fuel flow rate command value CSO such that the blade path temperature Tb of the gas turbine does not exceed its upper limit value. The second temperature controller 134 outputs a command value EXCSO for adjusting the total fuel flow rate command value CSO such that the exhaust gas temperature Te does not exceed its upper limit value. The low value selector 135 outputs the lowest command value among the command values from the controllers 131 to 134. The limiter 136 limits the increase/decrease rate of the command from the low value selector 135.

The governor controller 131 receives the rotational frequency N of the gas turbine rotor 28 from the rotational frequency gauge 71 and outputs a command value GVCSO for adjusting the total fuel flow rate command value CSO such that the rotational frequency N of the gas turbine rotor 28 matches the target rotational frequency. Specifically, the governor controller 131 compares the measured rotational frequency N of the gas turbine rotor 28 with a preset GV setting value, and outputs a proportional control signal as the command value GVCSO.

The load controller 132 receives the measured output PW of the generator 29 from the output gauge 72 and the generator output command value from a host control device 90 (see FIG. 1). The load controller 132 outputs a command value LDCSO for adjusting the total fuel flow rate command value CSO such that the measured output PW matches the generator output command value. Specifically, the load controller 132 compares the measured output PW with the generator output command value, computes a proportional integral, and outputs the result thereof as the command value LDCSO.

The first temperature controller 133 receives the blade path temperature Tb from the blade path temperature gauge 75, and outputs a command value BPCSO for adjusting the total fuel flow rate command value CSO such that the blade path temperature Tb does not exceed its upper limit value. Specifically, the first temperature controller 133 compares the measured blade path temperature Tb with the upper limit value thereof, computes a proportional integral, and outputs the result thereof as the command value BPCSO.

The second temperature controller 134 receives the exhaust gas temperature Te from the exhaust gas temperature gauge 76, and outputs a command value EXCSO for adjusting the total fuel flow rate command value CSO such that the exhaust gas temperature Te does not exceed its upper limit value. Specifically, the second temperature controller 134 compares the measured exhaust gas temperature Te with the upper limit value thereof, computes a proportional integral, and outputs the result thereof as the command value EXCSO.

The low value selector 135 selects the lowest command value among the command values from the controllers 131 to 134 and outputs the selected command value. The limiter 136 limits the increase/decrease rate of the command from the low value selector 135, and outputs this as the total fuel flow rate command value CSO.

Figure 8:
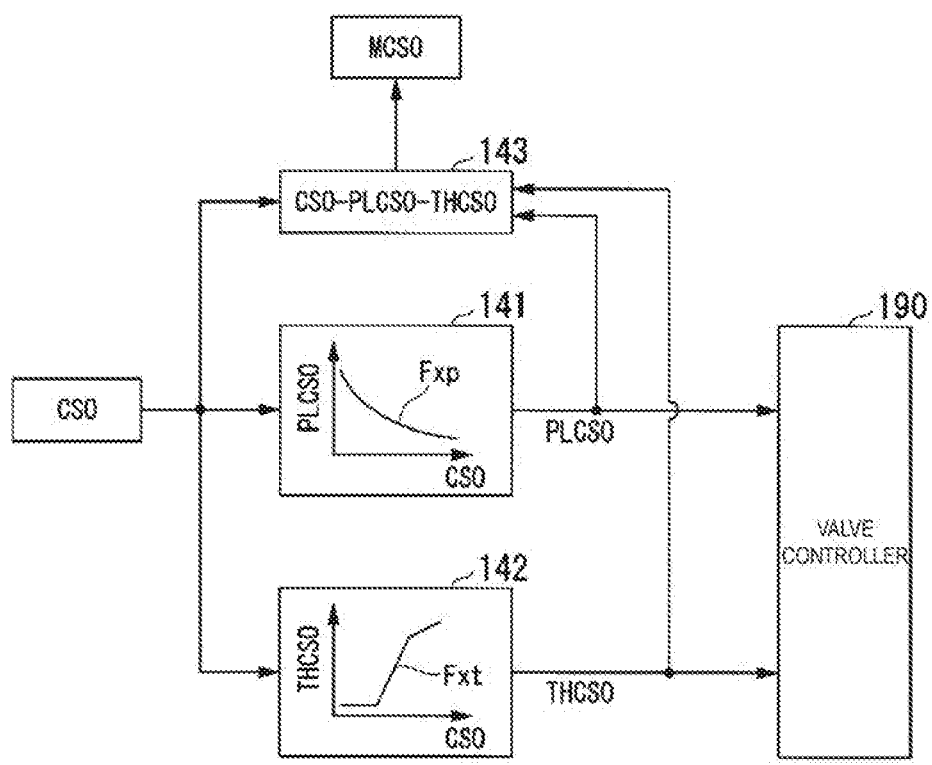
FIG. 8 is a function block diagram of a pilot flow rate computing unit, a top hat flow rate computing unit, and a main flow rate computing unit according to the embodiment of the present invention.

The pilot flow rate computing unit 141 has a function Fxp that specifies the relationship between the total fuel flow rate command value CSO and the pilot flow rate command value PLCSO, as illustrated in FIG. 8. Using this function Fxp, the pilot flow rate computing unit 141 determines the pilot flow rate command value PLCSO corresponding to the total fuel flow rate command value CSO generated by the total fuel flow rate generator 130. The top hat flow rate computing unit 142 has a function Fxt that specifies the relationship between the total fuel flow rate command value CSO and the top hat flow rate THCSO. Using this function Fxt, the top hat flow rate computing unit 142 determines the top hat flow rate THCSO corresponding to the total fuel flow rate command value CSO output by the total fuel flow rate generator 130. As shown by Equation (2) below, the main flow rate computing unit 143 determines the main flow rate MCSO by subtracting the pilot flow rate command value PLCSO and the top hat flow rate THCSO from the total fuel flow rate command value CSO.

$$MCSO = CLO - PLCSO - THCSO \quad (2)$$

Figure 9:
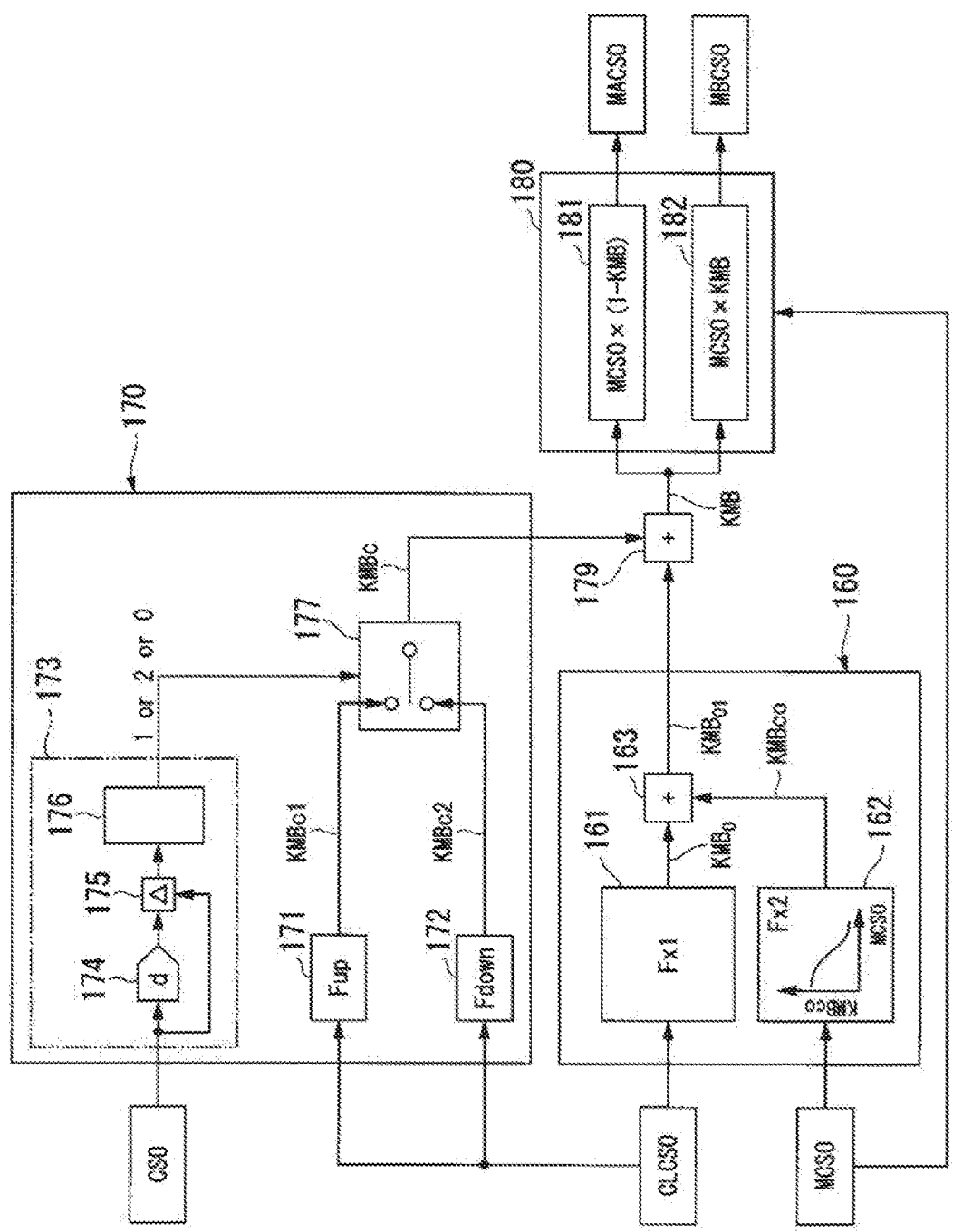
FIG. 9 is a function block diagram of a nozzle group flow rate ratio computing unit, a correction value computing unit, a corrector, and a nozzle group flow rate computing unit according to the embodiment of the present invention.

As illustrated in FIG. 9, the nozzle group flow rate ratio computing unit 160 includes a nozzle group flow rate ratio generator 161 that generates a nozzle group flow rate ratio $KMB_0$, a correction value generator 162 that generates a correction value $KMB_{co}$ for the nozzle group flow rate ratio $KMB_0$, and a corrector 163 that corrects the nozzle group flow rate ratio $KMB_0$ by the correction value $KMB_{co}$ generated by the correction value generator 162.

The nozzle group flow rate ratio generator 161 has a function Fx1 (a flow rate ratio relationship) that specifies the relationship between the combustion load command value CLCSO and the nozzle group flow rate ratio (fuel flow rate ratio) $KMB_0$. As shown by Equation (3) below, the nozzle group flow rate ratio KMB is a value obtained by dividing the main B flow rate MBCSO, which is the flow rate of the main B fuel Fmb supplied to the main nozzle B group 54B, by a value obtained by adding the main A flow rate MACSO, which is the flow rate of the main A fuel Fma supplied to the main nozzle A group 54A, and the main B flow rate MBCSO.

$$KMB = MBCSO/(MACSO + MBCSO) \quad (3)$$

In a case that the fuel is supplied at the same flow rate to each of the three main nozzles 54 forming the main nozzle A group 54A and the five main nozzles 54 forming the main nozzle B group 54B, the nozzle group flow rate ratio KMB becomes 0.625 as shown by Equation (4) below.

$$KMB=5/(3+5)=0.625 \qquad (4)$$

This value 0.625 is used as a reference value for the nozzle group flow rate ratio $KMB_0$, which is specified by the function Fx1 with respect to the combustion load command value CLCSO.

Figure 10:
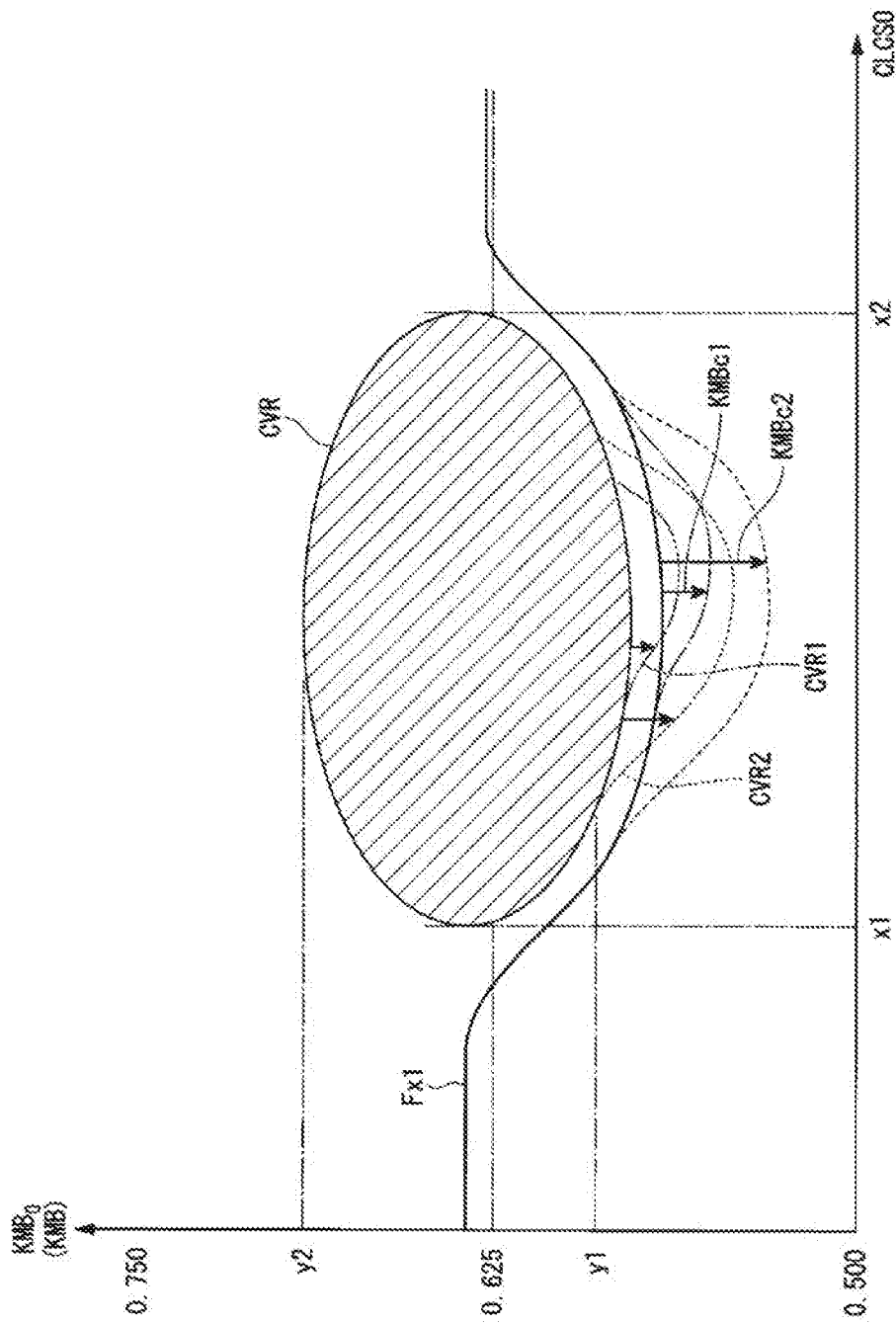
FIG. 10 is an explanatory diagram illustrating a function that specifies a relationship between a combustion load command value and a nozzle group flow rate ratio, and a combustion oscillation region according to the embodiment of the present invention.

As illustrated in FIG. 10, a combustion oscillation region CVR may occur in a region in which the combustion load command value CLCSO is within a predetermined range and the nozzle group flow rate ratio KMB is also within a predetermined range. Here, it is assumed that the combustion oscillation region CVR occurs when the combustion load command value CLCSO is within the range of x1 to x2 (x1<x2) and the nozzle group flow rate ratio KMB is within the range of y1 to y2 (y1<0.625<y2), for example. Note that the combustion oscillation region CVR is identified in advance, using the actual combustor 31 or a simulator that simulates a combustion state of the combustor 31.

The function Fx1 is a function that is formulated so as to avoid the combustion oscillation region CVR, in which a combustion oscillation occurs, among regions defined by the combustion load command value CLCSO and the nozzle group flow rate ratio KMB, as illustrated in FIG. 10. Specifically, this function Fx1 is a function in which the nozzle group flow rate ratio $KMB_0$ is an almost constant value greater than 0.625 when the combustion load command value CLCSO is smaller than x1. Further, this function Fx1 is a function in which, when the combustion load command value CLCSO is within the range of x1 to x2, the nozzle group flow rate ratio $KMB_0$ changes along a bottom side (a side on which the nozzle group flow rate ratio KMB is smaller) of the outer edge of the combustion oscillation region CVR as the combustion load command value CLCSO becomes greater. More specifically, this function Fx1 is a function in which, when the combustion load command value CLCSO is within the range of x1 to x2 and is a value closer to x1, the nozzle group flow rate ratio $KMB_0$ becomes smaller along the bottom side of the outer edge of the combustion oscillation region CVR as the combustion load command value CLCSO becomes greater. Further, this function Fx1 is a function in which, when the combustion load command value CLCSO is within the range of x1 to x2 and is a value closer to x2, the nozzle group flow rate ratio $KMB_0$ becomes greater along the bottom side of the outer edge of the combustion oscillation region CVR as the combustion load command value CLCSO becomes greater. Further, this function Fx1 is a function in which, when the combustion load command value CLCSO is greater than x2, the nozzle group flow rate ratio $KMB_0$ is almost 0.625, regardless of the combustion load command value CLCSO.

As described above, this function Fx1 is a function in which, when the combustion load command value CLCSO is within a certain range, the nozzle group flow rate ratio $KMB_0$ becomes smaller as the combustion load command value CLCSO becomes greater, when the combustion load command value CLCSO is within another range, the nozzle group flow rate ratio $KMB_0$ becomes greater as the combustion load command value CLCSO becomes greater, and when the combustion load command value CLCSO is within yet another range, the nozzle group flow rate ratio $KMB_0$ becomes constant regardless of the changes in the combustion load command value CLCSO. However, this function Fx1 is a function in which the nozzle group flow rate ratio $KMB_0$ changes continuously as the combustion load command value CLCSO changes, regardless of the range of the combustion load command value CLCSO.

Using this function Fx1, the nozzle group flow rate ratio generator 161 generates the nozzle group flow rate ratio $KMB_0$ corresponding to the combustion load command value CLCSO generated by the combustion load command generator 110.

The correction value generator 162 of the nozzle group flow rate ratio computing unit 160 has a function Fx2 that specifies the relationship between the main flow rate MCSO and the correction value $KMB_0$ as illustrated in FIG. 9. Using this function Fx2, the correction value generator 162 generates the correction value $KMB_{co}$ corresponding to the main flow rate MCSO determined by the main flow rate computing unit 143. Generally, a valve does not have a linear relationship between the opening amount of the valve and the flow rate of a fluid flowing through the valve. Thus, here, the correction value $KMB_{co}$ is determined while taking into account valve characteristics of the main A fuel valve 66a and the main B fuel valve 66b, such that the actual nozzle group flow ratio becomes a target nozzle group flow rate ratio KMB, as a result of the valve controller 190 instructing the main A fuel valve 66a and the main B fuel valve 66b to apply specific opening amounts. The corrector 163 of the nozzle group flow rate ratio computing unit 160 corrects this nozzle group flow rate ratio $KMB_0$ by adding the correction value $KMB_{co}$ generated by the correction value generator 162 to the nozzle group flow rate ratio $KMB_0$ generated by the nozzle group flow rate ratio generator 161. This post-correction nozzle group flow rate ratio $KMB_{01}$ becomes an output from the nozzle group flow rate ratio computing unit 160.

As illustrated in FIG. 9, the correction value computing unit 170 includes: a first correction value generator 171 that generates a first correction value KMBc1, which is a correction value applied when the output is increasing; a second correction value generator 172 that generates a second correction value KMBc2, which is a correction value applied when the output is decreasing; an output change detector 173 that detects a change in the total fuel flow rate command value CSO, which is correlated to a change in the gas turbine output; and a switching unit 177. The switching unit 177 outputs, to the corrector 179, one of the first correction value KMBc1, the second correction value KMBc2, and a correction value "0".

When the gas turbine output changes, a region of the combustion oscillation region CVR changes, as illustrated in FIG. 10. The change in the region of the combustion oscillation region CVR is different between when the gas turbine output is increasing and when the gas turbine output is decreasing. A combustion oscillation region CVR1 that occurs when the output is increasing, is a region in which the bottom side (the side on which the nozzle group flow rate ratio KMB is smaller) of the outer edge of the combustion oscillation region CVR that occurs when the gas turbine output is not changing, is expanded downward, for example. A combustion oscillation region CVR2 that occurs when the output is decreasing, is a region in which the bottom side of the outer edge of the combustion oscillation region CVR that occurs when the gas turbine output is not changing, is expanded further downward than the bottom side of the outer edge of the combustion oscillation region CVR1 that occurs when the output is increasing. Note that the combustion oscillation region CVR1 that occurs when the output is increasing and the combustion oscillation region CVR2 that occurs when the output is decreasing are also identified in advance, using the actual combustor 31 or the simulator that simulates the combustion state of the combustor 31.

The first correction value generator 171 and the second correction value generator 172 each generate a correction value for correcting the nozzle group flow rate ratio $KMB_{01}$ determined by the nozzle group flow rate ratio computing unit 160, in order to respond to the change in the combustion oscillation region CVR, which is caused by the change in the gas turbine output in the above-described manner. The first correction value generator 171 has a function Fup (a correction value relationship) that specifies the relationship between the combustion load command value CLCSO and the first correction value KMBc1, which is the correction value applied when the output is increasing. The second correction value generator 172 has a function Fdown (a correction value relationship) that specifies the relationship between the combustion load command value CLCSO and the second correction value KMBc2, which is the correction value applied when the output is decreasing.

Figure 11:
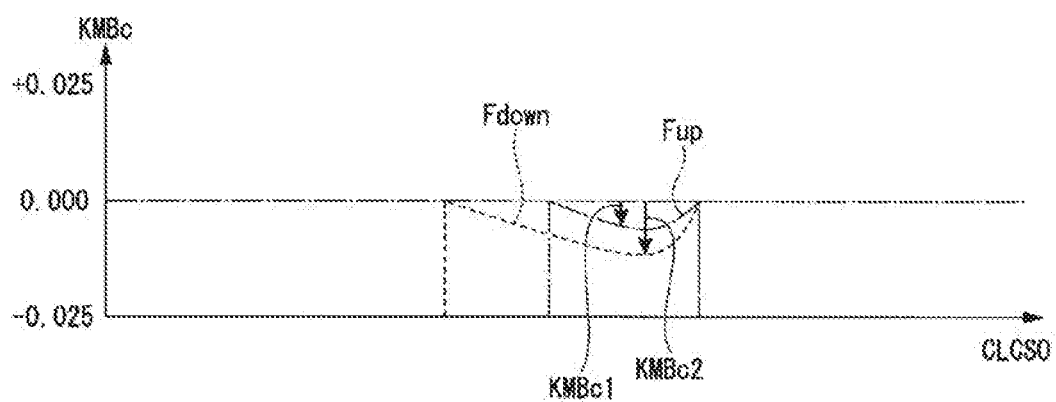
FIG. 11 is a graph showing a relationship between a correction value in relation to the nozzle group flow rate ratio and the combustion load command value according to the embodiment of the present invention.

As illustrated in FIG. 10 and FIG. 11, the function Fup is a function that is formulated so as to avoid the combustion oscillation region CVR1 that occurs when the output is increasing. As described above, the combustion oscillation region CVR1 that occurs when the output is increasing is the region in which the bottom side (the side on which the nozzle group flow rate ratio KMB is smaller) of the outer edge of the combustion oscillation region CVR that occurs when the gas turbine output is not changing, is expanded downward, for example. In this case, the function Fup associates a negative first correction value KMBc1 with the combustion load command value CLCSO so as to cause the nozzle group flow rate ratio $KMB_{01}$ from the nozzle group flow rate ratio computing unit 160 to be smaller.

Further, the function Fdown is a function that is formulated so as to avoid the combustion oscillation region CVR2 that occurs when the output is decreasing. As described above, the combustion oscillation region CVR2 that occurs when the output is decreasing is the region in which the bottom side of the outer edge of the combustion oscillation region CVR that occurs when the gas turbine output is not changing, is expanded further downward than the bottom side of the outer edge of the combustion oscillation region CVR1 that occurs when the output is increasing. In this case, the function Fdown associates a negative second correction value KMBc2, which is even smaller than the first correction value KMBc1 applied when the output is increasing, with the combustion load command value CLCSO so as to cause the nozzle group flow rate ratio $KMB_{01}$ from the nozzle group flow rate ratio computing unit 160 to be even smaller than the ratio applied when the output is increasing.

Using the function Fup, the first correction value generator 171 generates the first correction value KMBc1 corresponding to the combustion load command value CLCSO. Further, using the function Fdown, the second correction value generator 172 generates the second correction value KMBc2 corresponding to the combustion load command value CLCSO.

As described above, in the present embodiment, both the first correction value KMBc1 generated by the first correction value generator 171 and the second correction value KMBc2 generated by the second correction value generator 172 are correction values that cause the nozzle group flow rate ratio $KMB_{01}$ from the nozzle group flow rate ratio computing unit 160 to be smaller. In other words, given the definition of the nozzle group flow rate ratio KMB shown by Equation (3), the first correction value KMBc1 and the second correction value KMBc2 according to the present embodiment are both values that decrease the main B flow rate MBCSO supplied to the main nozzle B group 54B, which, of the main nozzle A group 54A and the main nozzle B group 54B, has a greater number of the main nozzles 54.

As illustrated in FIG. 9, the output change detector 173 includes: a delay unit 174 that outputs the total fuel flow rate command value CSO from the total fuel flow rate generator 130 after a predetermined amount of time elapses; a subtractor 175 that determines a difference between the total fuel flow rate command value CSO from the total fuel flow rate generator 130 and the total fuel flow rate command value CSO from the delay unit 174; and a change determiner 176 that determines whether the total fuel flow rate command value CSO is increasing by a predetermined value or greater or decreasing by a predetermined value or greater on the basis of the subtraction result. When the subtraction result from the subtractor 175 is a positive value and the value is equal to or greater than the predetermined value, the change determiner 176 outputs "1", which indicates that the gas turbine output is increasing. When the subtraction result from the subtractor is a negative value and the value is equal to or less than the predetermined value, the change determiner 176 outputs "2", which indicates that the gas turbine output is decreasing, and in other cases, the change determiner 176 outputs "0", which indicates that the gas turbine output is not changing.

When the output change detector 173 outputs "1" that indicates that the gas turbine output is increasing, the switching unit 177 selects the first correction value KMBc1 from the first correction value generator 171, and outputs the first correction value KMBc1. When the output change detector 173 outputs "2" that indicates that the gas turbine output is decreasing, the switching unit 177 selects the second correction value KMBc2 from the second correction value generator 172, and outputs the second correction value KMBc2. When the output change detector 173 outputs "0" that indicates that the gas turbine output is not changing, the switching unit 177 outputs the correction value "0". The output from the switching unit 177 becomes an output from the correction value computing unit 170.

The corrector 179 corrects the nozzle group flow rate ratio $KMB_{01}$ by adding the correction value KMBc from the correction value computing unit 170 to the nozzle group flow rate ratio $KMB_{01}$ from the nozzle group flow rate ratio computing unit 160. Specifically, when the gas turbine output is increasing, the corrector 179 adds the first correction value KMBc1 to the nozzle group flow rate ratio $KMB_{01}$ from the nozzle group flow rate ratio computing unit 160. When the gas turbine output is decreasing, the corrector 179 adds the second correction value KMBc2 to the nozzle group flow rate ratio $KMB_{01}$ from the nozzle group flow rate ratio computing unit 160. When the gas turbine output is not changing, the corrector 179 adds the correction value "0" to the nozzle group flow rate ratio $KMB_{01}$ from the nozzle group flow rate ratio computing unit 160. In other words, the nozzle group flow rate ratio $KMB_{01}$ from the nozzle group flow rate ratio computing unit 160 is not corrected.

Similarly to the nozzle group flow rate ratio $KMB_{01}$ output from the nozzle group flow rate ratio computing unit 160, the nozzle group flow rate ratio KMB output from the corrector 179 changes continuously as the combustion load command value CLCSO changes.

The nozzle group flow rate computing unit 180 has a main A flow rate computing unit 181 that determines the main A flow rate MACSO and a main B flow rate computing unit 182 that determines the main B flow rate MBCSO. The main A flow rate computing unit 181 determines the main A flow rate MACSO by subtracting from "1" the nozzle group flow rate ratio KMB from the corrector 179, and multiplying the resulting value by the main flow rate MCSO determined by the main flow rate computing unit 143. The main B flow rate computing unit 182 determines the main B flow rate MBCSO by multiplying the nozzle group flow rate ratio KMB from the corrector 179 by the main flow rate MCSO determined by the main flow rate computing unit 143.

As illustrated in FIG. 5, the valve controller 190 determines the opening amount for the pilot fuel valve 65 corresponding to the pilot flow rate command value PLCSO determined by the pilot flow rate computing unit 141, and instructs the pilot fuel valve 65 to apply this opening amount. The valve controller 190 determines the opening amount for the top hat fuel valve 67 corresponding to the top hat flow rate THCSO determined by the top hat flow rate computing unit 142, and instructs the top hat fuel valve 67 to apply this opening amount. The valve controller 190 determines the opening amount for the main A fuel valve 66a corresponding to the main A flow rate MACSO determined by the nozzle group flow rate computing unit 180, and instructs the main A fuel valve 66a to apply this opening amount. The valve controller 190 determines the opening amount for the main B fuel valve 66b corresponding to the main B flow rate MBCSO determined by the nozzle group flow rate computing unit 180, and instructs the main B fuel valve 66b to apply this opening amount.

Next, operations of the gas turbine plant of the present embodiment will be described.

As illustrated in FIG. 1, the compressor of the gas turbine 10 generates the compressed air Ac by compressing the air A. This compressed air Ac flows into the combustor 31. The fuel F is supplied to the combustor 31. The fuel F is combusted in the compressed air Ac inside the combustor 31 to generate the high-temperature, high-pressure combustion gas. This combustion gas is supplied from the combustor 31 into the combustion gas channel in the turbine 21 to rotate the turbine rotor 23, With the rotation of this turbine rotor 23, the generator 29 connected to the gas turbine 10 generates power.

The fuel F from a fuel supply source flows in the fuel main line 60. A portion of the fuel F is supplied, as the pilot fuel Fp, to the pilot nozzle 44 via the pilot fuel line 61 and the pilot fuel valve 65. The pilot fuel Fp supplied to the pilot nozzle 44 is sprayed from the pilot nozzle 44 into the combustion liner 33, as illustrated in FIG. 2 and FIG. 3. Further, a portion of the compressed air Ac from the compressor 11 passes through the pilot air tube 45 as the pilot air Ap and is sprayed from the pilot air tube 45 into the combustion liner 33. The pilot fuel Fp is combusted through diffusion combustion in the pilot air Ap to form the diffusion flame 49.

A portion of the fuel F that has flowed through the fuel main line 60 is supplied, as the main A fuel Fma, to the plurality of main nozzles 54 forming the main nozzle A group 54A via the main A fuel line 62a and the main A fuel valve 66a. Further, a portion of the fuel F that has flowed through the fuel main line 60 is supplied, as the main B fuel Fmb, to the plurality of main nozzles 54 forming the main nozzle B group 54B via the main B fuel line 62b and the main B fuel valve 66b. The main fuel Fm that has been supplied to those main nozzles 54 is sprayed from the main nozzles 54 into the main air channel 58, as illustrated in FIG. 2 and FIG. 3. Further, a portion of the compressed air Ac from the compressor 11 flows into the main air channel 58 as the main air Am. Inside the main air channel 58, the main air Am and the main fuel Fm are mixed to form the premixed gas. This premixed gas is sprayed from the main air channel 58 into the combustion liner 33. The premixed gas sprayed from the main air channel 58 is combusted through premixed combustion and forms the premixed flame 59.

A portion of the fuel F that has flowed through the fuel main line 60 is supplied, as the top hat fuel Ft, to the plurality of top hat nozzles 51 via the top hat fuel line 63 and the top hat fuel valve 67, as illustrated in FIG. 2. The top hat fuel Ft that has been supplied to the top hat nozzles 51 is sprayed into the compressed air channel 52 provided between the inner circumferential side of the external cylinder 32 of the combustor 31 and the outer circumferential side of the combustor basket 42 of the combustor 31. This top hat fuel Ft is mixed into the main air Am and the pilot air Ap. Thus, a portion of the top hat fuel Ft is included in the gas sprayed from the pilot burner 43 and is combusted as a result of the combustion of the gas. Further, a portion of the remaining top hat fuel Ft is included in the gas sprayed from the main burners 53 and is combusted as a result of the combustion of the gas.

Each of the fuel valves 65, 66a, 66b, and 67 are controlled by the control device 100.

As described above, the total fuel flow rate generator 130 of the control device 100 generates the total fuel flow rate command value CSO in accordance with the generator output command value, and the like. The pilot flow rate computing unit 141 determines the pilot flow rate command value PLCSO corresponding to the total fuel flow rate command value CSO. The valve controller 190 accepts the pilot flow rate command value PLCSO and determines the opening amount for the pilot fuel valve 65 corresponding to the pilot flow rate command value PLCSO, and instructs the pilot fuel valve 65 to apply this opening amount. The pilot fuel valve 65 accepts this instruction and applies the instructed opening amount. As a result, the pilot flow rate at the time of passing though the pilot fuel valve 65 becomes the pilot flow rate command value PLCSO generated by the pilot flow rate computing unit 141. The top hat flow rate computing unit 142 determines the top hat flow rate THCSO corresponding to the total fuel flow rate command value CSO. The valve controller 190 accepts the top hat flow rate THCSO and determines the opening amount for the top hat fuel valve 67 corresponding to the top hat flow rate THCSO, and instructs the top hat fuel valve 67 to apply this opening amount. The top hat fuel valve 67 accepts this instruction and applies the instructed opening amount. As a result, the top hat flow rate at the time of passing through the top hat fuel valve 67 becomes the top hat flow rate THCSO generated by the top hat flow rate computing unit 142. The main flow rate computing unit 143 determines the main flow rate MCSO corresponding to the total fuel flow rate command value CSO.

Figure 12:
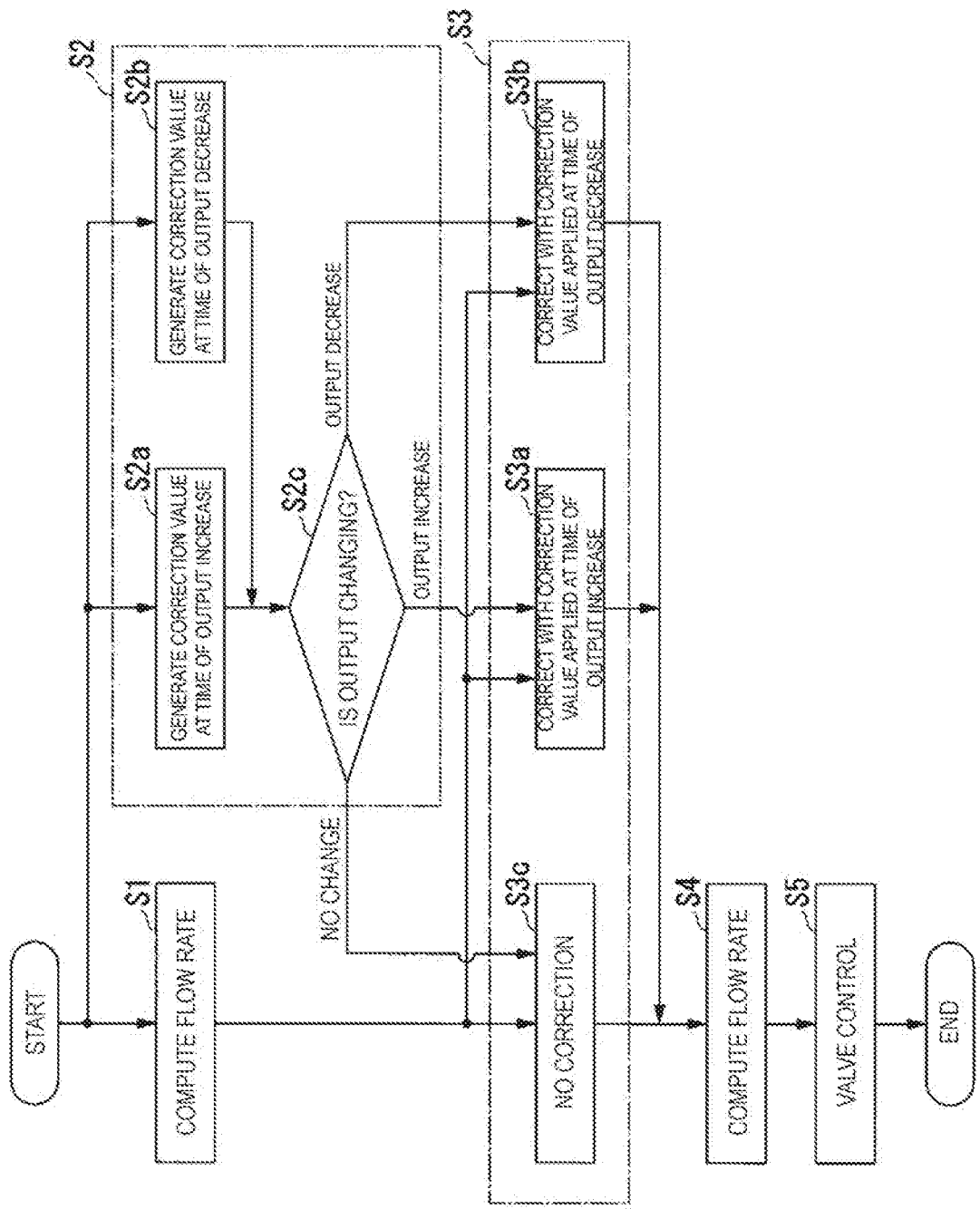
FIG. 12 is a flowchart illustrating operations of the nozzle group flow ratio computing unit, the correction value computing unit, the corrector, the nozzle group flow rate computing unit, and a valve controller according to the embodiment of the present invention.

Next, control of the main A fuel valve 66a and the main B fuel valve 66b by the control device 100 will be described with reference to a flowchart illustrated in FIG. 12.

The nozzle group flow rate ratio computing unit 160 determines the nozzle group flow rate ratio $KMB_{01}$ corresponding to the combustion load command value CLCSO and the main flow rate MCSO (S1: a flow rate ratio computing step). As illustrated in FIG. 9, using the function Fx1, the nozzle group flow rate ratio generator 161 of the nozzle group flow rate ratio computing unit 160 generates the nozzle group flow rate ratio $KMB_0$ corresponding to the combustion load command value CLCSO generated by the combustion load command generator 110. Using the function Fx2, the correction value generator 162 of the nozzle group flow rate ratio computing unit 160 determines the correction value $KMB_{co}$ corresponding to the main flow rate MCSO. The corrector 163 of the nozzle group flow rate ratio computing unit 160 corrects the nozzle group flow rate ratio $KMB_0$ by adding the correction value $KMB_{co}$ determined by the correction value generator 162 to the nozzle group flow rate ratio $KMB_0$ generated by the nozzle group flow rate ratio generator 161. This post-correction nozzle group flow rate ratio $KMB_{01}$ becomes an output from the nozzle group flow rate ratio computing unit 160.

In parallel with the flow rate ratio computing step (S1) performed by the nozzle group flow rate ratio computing unit 160, the correction value computing unit 170 determines the correction value KMBc for the nozzle group flow rate ratio $KMB_{01}$ corresponding to the change in the output of the gas turbine 10 (S2: a correction value computing step). Using the function Fup, the first correction value generator 171 of the correction value computing unit 170 generates the first correction value KMBc1 corresponding to the combustion load command value CLCSO (S2a). This first correction value KMBc1 is the correction value KMBc applied when the gas turbine output is increasing. Further, using the function Fdown, the second correction value generator 172 of the correction value computing unit 170 generates the second correction value KMBc2 corresponding to the combustion load command value CLCSO (S2b). This second correction value KMBc2 is the correction value KMBc applied when the gas turbine output is decreasing. On the basis of the total fuel flow rate command value CSO, the output change detector 173 of the correction value computing unit 170 determines whether the gas turbine output is increasing, the gas turbine output is decreasing, or the gas turbine output is not changing (S2c). When the output change detector 173 determines that the gas turbine output is increasing, the output change detector 173 outputs "1", which indicates that the output is increasing. When the output change detector 173 determines that the gas turbine output is decreasing, the output change detector 173 outputs "2", which indicates that the output is decreasing. When the output change detector 173 determines that the gas turbine output is not changing, the output change detector 173 outputs "0", which indicates that the output is not changing. When "1" is output from the output change detector 173, the switching unit 177 of the correction value computing unit 170 outputs, to the corrector 179, the first correction value KMBc1 applied when the gas turbine output is increasing as the correction value KMBc. When "2" is output from the output change detector 173, the switching unit 177 outputs, to the corrector 179, the second correction value KMBc2 applied when the gas turbine output is decreasing as the correction value KMBc. When "0" is output from the output change detector 173, the switching unit 177 outputs, to the corrector 179, the correction value "0" as the correction value KMBc.

The corrector 179 corrects the nozzle group flow rate ratio $KMB_{01}$ by adding the correction value KMBc from the correction value computing unit 170 to the nozzle group flow rate ratio $KMB_{01}$ from the nozzle group flow rate ratio computing unit 160 (S3: a correcting step). When the corrector 179 accepts the first correction value KMBc1 applied when the gas turbine output is increasing from the correction value computing unit 170, the corrector 179 adds the first correction value KMBc1 to the nozzle group flow rate ratio $KMB_{01}$ from the nozzle group flow rate ratio computing unit 160 (S3a). When the corrector 179 accepts the second correction value KMBc2 applied when the gas turbine output is decreasing from the correction value computing unit 170, the corrector 179 adds the second correction value KMBc2 to the nozzle group flow rate ratio $KMB_{01}$ from the nozzle group flow rate ratio computing unit 160 (S3b). When the corrector 179 accepts the correction value "0" from the correction value computing unit 170, the corrector 179 adds the correction value "0" to the nozzle group flow rate ratio $KMB_{01}$ from the nozzle group flow rate ratio computing unit 160 (S3c). Specifically, at step S3c, the nozzle group flow rate ratio $KMB_{01}$ from the nozzle group flow rate ratio computing unit 160 is not corrected in actuality.

The nozzle group flow rate computing unit 180 determines the main A flow rate MACSO and the main B flow rate MBCSO, using the main flow rate MCSO determined by the main flow rate computing unit 143 and the nozzle group flow rate ratio KMB from the corrector 179 (S4: a flow rate computing step). The main A flow rate computing unit 181 of the nozzle group flow rate computing unit 180 determines the main A flow rate MACSO by subtracting from "1" the nozzle group flow rate ratio KMB from the corrector 179, and multiplying the resulting value by the main flow rate MCSO determined by the main flow rate computing unit 143. The main B flow rate computing unit 182 of the nozzle group flow rate computing unit 180 determines the main B flow rate MBCSO by multiplying the nozzle group flow rate ratio KMB from the corrector 179 by the main flow rate MCSO determined by the main flow rate computing unit 143.

The valve controller 190 accepts the main A flow rate MACSO, determines the opening amount for the main A fuel valve 66a corresponding to the main A flow rate MACSO, and instructs the main A fuel valve 66a to apply this opening amount. Further, the valve controller 190 accepts the main B flow rate MBCSO, determines the opening amount for the main B fuel valve 66b corresponding to the main B flow rate MBCSO, and instructs the main B fuel valve 66b to apply this opening amount (S5: a valve controlling step). The main A fuel valve 66a accepts this instruction and applies the instructed opening amount. As a result, the main A flow rate, which passes through the main A fuel valve 66a and is supplied to all the main nozzles 54 forming the main nozzle A group 54A, becomes the main A flow rate MACSO determined by the nozzle group flow rate computing unit 180. Further, the main B fuel valve 66b accepts this instruction and applies the instructed opening amount. As a result, the main B flow rate, which passes through the main B fuel valve 66b and is supplied to all the main nozzles 54 forming the main nozzle B group 54B, becomes the main B flow rate MBCSO determined by the nozzle group flow rate computing unit 180.

As described above, the combustion oscillation region CVR may occur in the region in which the gas turbine output is within the predetermined range and the nozzle group flow rate ratio KMB is within the predetermined range. In the present embodiment, as described above, the occurrence of the combustion oscillation in the course of combusting the fuel is suppressed by changing the nozzle group flow rate ratio KMB in accordance with the combustion load command value CLCSO having a correlation with the gas turbine output. Further, in the present embodiment, the function Fx1 that specifies the relationship between the combustion load command value CLCSO and the nozzle group flow rate ratio $KMB_0$ is the function in which the nozzle group flow rate ratio $KMB_0$ changes continuously as the combustion load command value CLCSO changes. Thus, in the present embodiment, the nozzle group flow rate ratio KMB does not suddenly change significantly. As a result, in the present embodiment, the combustion stability of the fuel F can be improved.

Further, as described above, when the gas turbine output is changing, the combustion oscillation region CVR changes in accordance with the change in the gas turbine output. Thus, in the present embodiment, when the gas turbine output is changing, the combustion oscillation in the course of combusting the fuel F is avoided by correcting the nozzle group flow rate ratio $KMB_{01}$, and the combustion stability of the fuel F is achieved.

Modified Example

In the above-described embodiment, the function Fx1 that specifies the relationship between the combustion load command value CLCSO and the nozzle group flow rate ratio $KMB_0$ is the function in which, in order to avoid the combustion oscillation region CVR, the nozzle group flow rate ratio $KMB_{01}$ changes along the bottom side (the side on which the nozzle group flow rate ratio KMB is smaller) of the outer edge of the combustion oscillation region CVR as the combustion load command value CLCSO changes. However, as illustrated in FIG. 13, depending on the form of the combustor, the type of the fuel and the like, in order to avoid the combustion oscillation region CVR, a function, in which the nozzle group flow rate ratio $KMB_{01}$ changes along an upper side (on a side in which the nozzle group flow rate ratio MB is greater) of the outer edge of the combustion oscillation region CVR as the combustion load command value CLCSO changes, may be used as the function Fx1.

Figure 13:
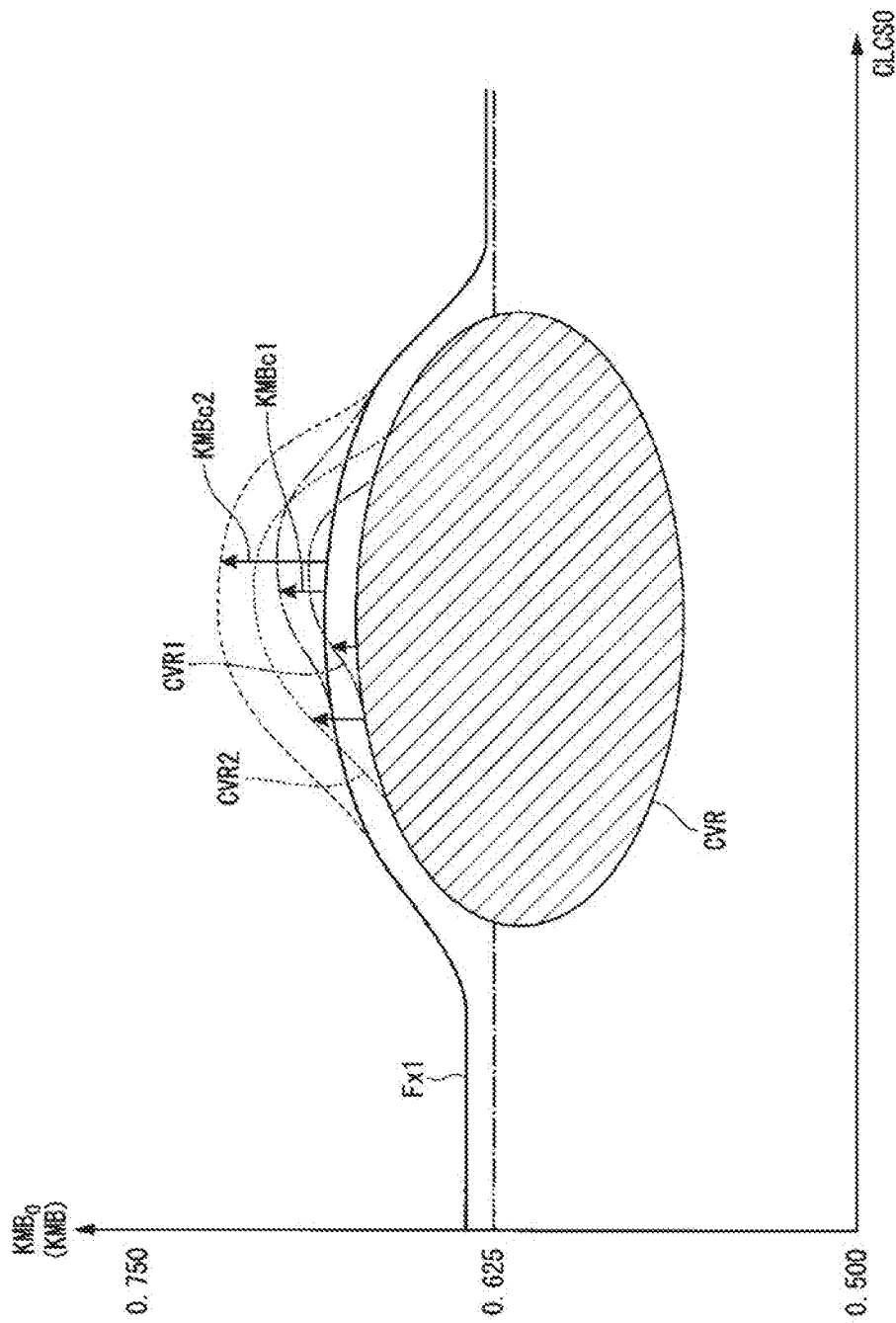
FIG. 13 is an explanatory diagram illustrating a function that specifies the relationship between the combustion load command value and the nozzle group flow rate ratio, and the combustion oscillation region according to a modified example of the embodiment of the present invention.
Figure 14:
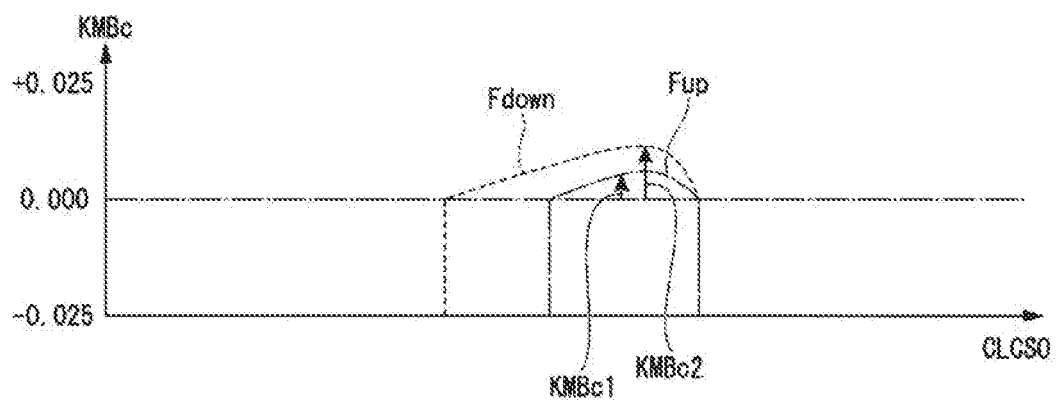
FIG. 14 is a graph showing the relationship between the correction value in relation to the nozzle group flow rate ratio and the combustion load command value according to the modified example of the embodiment of the present invention.

The combustion oscillation regions CVR1 and CVR2 that respectively occur when the gas turbine output is increasing and when the gas turbine output is decreasing may become a region in which the upper side (the side on which the nozzle group flow rate ratio KMB is greater) of the outer edge of the combustion oscillation region CVR that occurs when the gas turbine output is not changing, is expanded upward, as illustrated in FIG. 13. In a case that the function illustrated in FIG. 13 is used as the function Fx1, in order to avoid the combustion oscillation region CVR that occurs when the gas turbine output is changing, it is preferable that both the first correction value KMBc1 applied when the output is increasing and the second correction value KMBc2 applied when the output is decreasing be positive values that cause the nozzle group flow rate ratio $KMB_{01}$ from the nozzle group flow rate ratio computing unit 160 to be greater, as illustrated in FIG. 13 and FIG. 14.

Thus, the correction value KMBc that corrects the nozzle group flow rate ratio $KMB_{01}$ from the nozzle group flow rate ratio computing unit 160 may be a value that causes the nozzle group flow rate ratio $KMB_{01}$ to be greater or a value that causes the nozzle group flow rate ratio $KMB_{01}$ to be smaller in accordance with the changes of the combustion oscillation region CVR that occurs when the gas turbine output is changing.

In the above-described embodiment, the eight main nozzles 54 are divided into the main nozzle A group 54A formed by the three main nozzles 54 and the main nozzle B group 54B formed by the five main nozzles 54. However, the eight nozzles may be divided into a main nozzle group formed by one of the main nozzles 54 and a main nozzle group formed by seven of the main nozzles. Further, the eight nozzles may be divided into a main nozzle group formed by two of the main nozzles 54 and a main nozzle group formed by six of the main nozzles, or may be divided into a main nozzle group formed by four of the main nozzles 54 and a main nozzle group formed by four of the main nozzles.

Further, the number of the main nozzles 54 need not necessarily be eight, and may be less than or more than eight.

Furthermore, in the above-described embodiment, the plurality of main nozzles 54 are divided into two main nozzle groups, but they may be divided into three or more nozzle groups.

In the above-described embodiment, the relationship between two parameters is specified using a function. However, the relationship between two parameters may be specified using a map indicating a value of one parameter for each of various values of the other parameter.

In the above-described embodiment, the combustion load command value CLCSO is used as a parameter having a correlation with the gas turbine output. However, another parameter may be used as long as it is a parameter having a correlation with the gas turbine output. Examples of the parameter having a correlation with the gas turbine output include the generator output and the total fuel flow rate command value CSO, for example.

In the above-described embodiment, the top hat nozzles 51 are also premixing nozzles. Thus, similarly to the above-described embodiment, the plurality of top hat nozzles 51 according to the present embodiment may also be divided into a plurality of nozzle groups, and a nozzle group flow rate ratio between the nozzle groups may be changed in accordance with a parameter having a correlation with the gas turbine output.

INDUSTRIAL APPLICABILITY

According to an aspect of the present invention, combustion stability of a fuel can be improved in a gas turbine provided with a plurality of premixing nozzles that spray the fuel to be combusted through premixed combustion.

REFERENCE SIGNS LIST

10 Gas turbine
11 Compressor
14 IGV
21 Turbine
31 Combustor
33 Combustion liner (or transition piece)
43 Pilot burner
44 Pilot nozzle
51 Top hat nozzle (premixing nozzle)
53 Main burner
53A Main burner A group
53B Main burner B group
54 Main nozzle (premixing nozzle)
54A Main nozzle A group
54B Main nozzle B group
58*a* Gas channel frame
60 Fuel main line
61 Pilot fuel line
62*a* Main A fuel line
62*b* Main B fuel line
63 Top hat fuel line
65 Pilot fuel valve
66*a* Main A fuel valve
66*b* Main B fuel valve
67 Top hat fuel valve
71 Rotational frequency gauge 72 Output gauge
73 Intake temperature gauge
74 Intake pressure gauge
75 Blade path temperature gauge
76 Exhaust gas temperature gauge
100 Control device (fuel flow rate setting device)
110 Combustion load command generator (parameter generator)
130 Total fuel flow rate generator
141 Pilot flow rate computing unit
142 Top hat flow rate computing unit
143 Main flow rate computing unit (total premixed fuel computing unit)
160 Nozzle group flow rate ratio computing unit (flow rate ratio computing unit)
161 Nozzle group flow rate ratio generator
162 Correction value generator
163 Corrector
170 Correction value computing unit
171 First correction value generator
172 Second correction value generator
173 Output change detector
176 Change determiner
177 Switching unit
179 Corrector
180 Nozzle group flow rate computing unit (flow rate computing unit)
181 Main A flow rate computing unit
182 Main B flow rate computing unit
190 Valve controller

The invention claimed is:

1. A fuel flow rate setting device for a gas turbine provided with a plurality of premixing nozzle groups, wherein each premixing nozzle group of the plurality of premixing nozzle groups is defined by at least one premixing nozzle configured to spray a fuel to be combusted through premixed combustion, the fuel flow rate setting device comprising:
a flow rate ratio computing unit configured to accept a parameter having a correlation with a gas turbine output and to determine, using a predetermined flow rate ratio relationship between the parameter and a fuel flow rate ratio between the plurality of premixing nozzle groups, the fuel flow rate ratio corresponding to the parameter;
a flow rate computing unit configured to determine a flow rate of the fuel to be supplied to each premixing nozzle group of the plurality of premixing nozzle groups, using the fuel flow rate ratio determined by the flow rate ratio computing unit;
a correction value computing unit configured to determine a correction value in relation to the fuel flow rate ratio applied when the gas turbine output is changing; and
a corrector configured to correct the fuel flow rate ratio determined by the flow rate ratio computing unit, using the correction value determined by the correction value computing unit,
wherein:
the predetermined flow rate ratio relationship is a relationship in which the fuel flow rate ratio changes continuously as the parameter changes;
the flow rate computing unit is configured to determine the flow rate of the fuel for each premixing nozzle group of the plurality of premixing nozzle groups, using the fuel flow rate ratio corrected by the corrector, when the gas turbine output is changing;
the correction value computing unit is configured to accept the parameter and determine the correction value corresponding to the parameter using a predetermined correction value relationship between the parameter and the correction value;
the predetermined correction value relationship is a relationship between the parameter and the correction value, which is predetermined so as to avoid a combustion oscillation region in which combustion oscillation occurs when the gas turbine output is changing among regions defined by the parameter and the correction value;
the plurality of premixing nozzle groups includes a plurality of main nozzle groups disposed along a circumference in a circumferential direction so as to be centered around one axis;
the plurality of main nozzle groups is divided between a first main nozzle group and a second main nozzle group, the first main nozzle group being entirely within a first circumferential sector around the one axis, the second main nozzle group being entirely within a second circumferential sector around the one axis, wherein the first circumferential sector and the second circumferential sector are non-overlapping, and wherein the first circumferential sector and the second circumferential sector span the entire circumference; and
the fuel flow rate ratio includes a fuel flow rate ratio that is a value obtained by dividing the flow rate of the fuel to be supplied to the first main nozzle group, by a value obtained by adding the flow rate of the fuel to be supplied to the second main nozzle group and the flow rate of the fuel to be supplied to the first main nozzle group.

2. The fuel flow rate setting device according to claim 1, wherein:
the correction value computing unit is configured to determine whether the change in the gas turbine output is an output increase or an output decrease;
when the change in the gas turbine output is the output increase, the correction value computing unit is configured to determine the correction value using, as the predetermined correction value relationship, a correction value relationship applied at a time of the output increase; and
when the change in the gas turbine output is the output decrease, the correction value computing unit is configured to determine the correction value using, as the predetermined correction value relationship, a correction value relationship applied at a time of the output decrease.

3. The fuel flow rate setting device according to claim 1, wherein:
among the plurality of premixing nozzle groups, one premixing nozzle group of the premixing nozzle groups has a greater number of premixing nozzles than another premixing nozzle group of the premixing nozzle groups; and
the correction value determined using the predetermined correction value relationship is a value for decreasing the flow rate of the fuel to be supplied to the one premixing nozzle group.

4. The fuel flow rate setting device according to claim 1, further comprising:
a valve controller configured to specify an opening amount for a fuel flow rate adjustment valve provided for each premixing nozzle group of the plurality of premixing nozzle groups that adjusts the flow rate of the fuel to be supplied to each premixing nozzle group of the plurality of premixing nozzle groups, wherein the valve controller is configured to determine the opening amount for the fuel flow rate adjustment valve provided for each premixing nozzle group of the plurality of premixing nozzle groups, using the flow rate of the fuel for each premixing nozzle group of the plurality of premixing nozzle groups.

5. The fuel flow rate setting device according to claim 1, wherein
the predetermined flow rate ratio relationship is determined so as to avoid the combustion oscillation region in which combustion oscillation occurs among regions defined by the parameter and the fuel flow rate ratio.

6. The fuel flow rate setting device according to claim 1, further comprising:
a parameter generator configured to generate, as the parameter, an inlet temperature-correlated value having a positive correlation with a temperature of a turbine inlet, inside a turbine of the gas turbine, into which combustion gas from a combustor of the gas turbine flows.

7. The fuel flow rate setting device according to claim 1, further comprising:
a total premixed fuel computing unit configured to determine a total flow rate of the fuel to be supplied to all of the plurality of premixing nozzle groups,
wherein the flow rate computing unit is configured to determine the flow rate of the fuel to be supplied to each premixing nozzle group of the plurality of premixing nozzle groups, using the total flow rate of the fuel determined by the total premixed fuel computing unit and the fuel flow rate ratio determined by the flow rate ratio computing unit.

8. A gas turbine plant, comprising:
the fuel flow rate setting device according to claim 1; and
the gas turbine,
wherein the gas turbine includes:
a compressor configured to compress air;
a combustor configured combust fuel in the air compressed by the compressor to generate combustion gas; and
a turbine configured to be driven by the combustion gas, wherein the combustor includes:
a combustion liner in which the fuel is to be combusted;
a plurality of main burners configured to spray premixed gas which is formed by mixing fuel and air into the combustion liner; and
a plurality of main burner groups, each main burner group of the plurality of main burner groups being defined by at least one of the main burners,
wherein each main burner of the plurality of main burners includes:
one main nozzle as the premixing nozzle; and
a gas channel frame configured to generate the premixed gas by mixing the fuel sprayed from the one main nozzle and the air compressed by the compressor and spray the premixed gas into the combustion liner,
wherein the fuel flow rate setting device is configured to determine a fuel flow rate for each of the plurality of main burner groups.

9. The fuel flow rate setting device according to claim 1, wherein:
the plurality of premixing nozzle groups are adjacent to each other in the circumferential direction; and
the plurality of premixing nozzle groups comprise:

a first premixing nozzle group having at least one respective premixing nozzle at a first portion closer to an axis of a rotor of the gas turbine; and
a second premixing nozzle group having at least one respective premixing nozzle at a second portion farther from the axis of the rotor of the gas turbine than the at least one respective premixing nozzle of the first premixing nozzle group.

10. The gas turbine plant according to claim 8, wherein:
the plurality of main burner groups are adjacent to each other in the circumferential direction; and
the plurality of main burner groups comprise:
a first main burner group having at least one respective main burner at a first portion closer to an axis of a rotor of the gas turbine; and
a second main burner group having at least one main burner at a second portion farther from the axis of the rotor of the gas turbine than the at least one respective main burner of the first main burner group.

11. A gas turbine plant, comprising:
the fuel flow rate setting device according to claim 1; and
the gas turbine,
wherein the gas turbine includes:
a compressor configured to compress air;
a combustor configured to combust fuel in the air compressed by the compressor to generate combustion gas; and
a turbine configured to be driven by the combustion gas, wherein the combustor includes:
a combustion liner in which the fuel is to be combusted;
a plurality of main burners configured to spray premixed gas which is formed by mixing fuel and the air from the compressor into the combustion liner;
a plurality of top hat nozzles, as the premixing nozzles, configured to spray the fuel into the air from the compressor, the air flowing into the main burners; and
a plurality of top hat nozzle groups each defined by at least one of the top hat nozzles,
wherein the fuel flow rate setting device is configured to determine a fuel flow rate for each of the plurality of top hat nozzle groups.

12. The gas turbine plant according to claim 11, wherein:
the plurality of top hat nozzle groups are adjacent to each other in the circumferential direction; and
the plurality of top hat nozzle groups comprise:
a first top hat nozzle group having at least one respective top hat nozzle at a first portion closer to an axis of a rotor of the gas turbine; and
a second top hat nozzle group having at least respective one top hat nozzle at a second portion farther from the axis of the rotor of the gas turbine than the at least one respective top hat nozzle of the first top hat nozzle group.

13. A fuel flow rate setting method for a gas turbine provided with a plurality of premixing nozzle groups, wherein each premixing nozzle group of the plurality of premixing nozzle groups is defined by at least one premixing nozzle configured to spray a fuel to be combusted through premixed combustion, the fuel flow rate setting method comprising:
a flow rate ratio computing step of accepting a parameter having a correlation with a gas turbine output and determining, using a predetermined flow rate ratio relationship between the parameter and a fuel flow rate ratio between the plurality of premixing nozzle groups, the fuel flow rate ratio corresponding to the parameter;

a flow rate computing step of determining a flow rate of the fuel to be supplied to each premixing nozzle group of the plurality of premixing nozzle groups, using the fuel flow rate ratio determined at the flow rate ratio computing step;

a correction value computing step of determining a correction value in relation to the fuel flow rate ratio applied when the gas turbine output is changing; and a correcting step of correcting the fuel flow rate ratio determined at the flow rate ratio computing step, using the correction value determined at the correction value computing step, wherein:

the predetermined flow rate ratio relationship is a relationship in which the fuel flow rate ratio changes continuously as the parameter changes;

at the flow rate computing step, the flow rate of the fuel for each premixing nozzle group of the plurality of premixing nozzle groups is determined using the fuel flow rate ratio corrected at the correcting step, when the gas turbine output is changing;

at the correction value computing step, the parameter is accepted to determine the correction value corresponding to the parameter, using a predetermined correction value relationship between the parameter and the correction value;

the predetermined correction value relationship is a relationship between the parameter and the correction value, which is predetermined so as to avoid a combustion oscillation region in which combustion oscillation occurs when the gas turbine output is changing among regions defined by the parameter and the correction value;

the plurality of premixing nozzle groups include a plurality of main nozzle groups disposed along a circumference in a circumferential direction so as to be centered around one axis;

the plurality of main nozzle groups is divided into a first main nozzle group and a second main nozzle group, the first main nozzle group being entirely within a first circumferential sector around the one axis, the second main nozzle group being entirely within a second circumferential sector around the one axis, wherein the first circumferential sector and the second circumferential sector are non-overlapping, and wherein the first circumferential sector and the second circumferential sector span the entire circumference; and the fuel flow rate ratio includes a fuel flow rate ratio that is a value obtained by dividing the flow rate of the fuel to be supplied to the first main nozzle group, by a value obtained by adding the flow rate of the fuel to be supplied to the second main nozzle group and the flow rate of the fuel to be supplied to the first main nozzle group.

14. The fuel flow rate setting method according to claim 13, wherein:

at the correction value computing step, whether the change in the gas turbine output is an output increase or an output decrease is determined;

when the change in the gas turbine output is the output increase, the correction value is determined using, as the predetermined correction value relationship, a correction value relationship applied at a time of the output increase; and when the change in the gas turbine output is the output decrease, the correction value is determined using, as the predetermined correction value relationship, a correction value relationship applied at a time of the output decrease.

15. The fuel flow rate setting method according to claim 13, wherein:

among the plurality of premixing nozzle groups, one premixing nozzle group of the premixing nozzle groups has a greater number of premixing nozzles than another premixing nozzle group of the premixing nozzle groups; and the correction value determined using the predetermined correction value relationship is a value for decreasing the flow rate of the fuel to be supplied to the one premixing nozzle group.

16. The fuel flow rate setting method according to claim 13, further comprising:

a valve controlling step of specifying an opening amount for a fuel flow rate adjustment valve provided for each premixing nozzle group of the plurality of premixing nozzle groups that adjusts the flow rate of the fuel to be supplied to each premixing nozzle group of the plurality of premixing nozzle groups, wherein, at the valve controlling step, the opening amount for the fuel flow rate adjustment valve provided for each premixing nozzle group of the plurality of premixing nozzle groups is determined, using the flow rate of the fuel for each premixing nozzle group of the plurality of premixing nozzle groups.

17. The fuel flow rate setting method according to claim 13, wherein:

the combustion oscillation region in which combustion oscillation occurs among regions defined by the parameter and the fuel flow rate ratio is identified in advance; and the predetermined flow rate ratio relationship is determined such that the fuel flow rate ratio corresponding to the parameter avoids the combustion oscillation region.

18. The fuel flow rate setting method according to claim 13, further comprising:

a parameter generating step of generating, as the parameter, an inlet temperature-correlated value having a positive correlation with a temperature of a turbine inlet, inside a turbine of the gas turbine, into which combustion gas from a combustor of the gas turbine flows.

19. The fuel flow rate setting method according to claim 13, wherein:

the plurality of premixing nozzle groups are adjacent to each other in the circumferential direction; and the plurality of premixing nozzle groups comprise:

a first premixing nozzle group having at least one respective premixing nozzle at a first portion closer to an axis of a rotor of the gas turbine; and a second premixing nozzle group having at least one respective premixing nozzle at a second portion farther from the axis of the rotor of the gas turbine than the at least one respective premixing nozzle of the first premixing nozzle group.

* * * * *